(12) United States Patent
Sugawara et al.

(10) Patent No.: US 7,590,356 B2
(45) Date of Patent: Sep. 15, 2009

(54) VARIABLE DISPERSION COMPENSATOR

(75) Inventors: Toshiki Sugawara, Kokuburji (JP);
Kazuhiko Hosomi, Tachikawa (JP);
Satoshi Makio, Kumagaya (JP)

(73) Assignee: Hitachi Metals Ltd., Tokyo (JP)

( * ) Notice: Subject to any disclaimer, the term of this patent is extended or adjusted under 35 U.S.C. 154(b) by 488 days.

(21) Appl. No.: 11/641,743

(22) Filed: Dec. 20, 2006

(65) Prior Publication Data

US 2007/0147840 A1 Jun. 28, 2007

(30) Foreign Application Priority Data

Dec. 26, 2005 (JP) ............................... 2005-371937

(51) Int. Cl.
*H04B 10/12* (2006.01)
*H04J 4/00* (2006.01)
(52) U.S. Cl. ..................... 398/149; 398/81; 398/150; 385/27
(58) Field of Classification Search .................. 398/81, 398/147, 149, 150; 385/27
See application file for complete search history.

(56) References Cited

U.S. PATENT DOCUMENTS

| | | | |
|---|---|---|---|
| 6,775,434 B2 * | 8/2004 | Sugawara ..................... 385/27 |
| 6,859,320 B2 * | 2/2005 | Yeh et al. ..................... 398/147 |
| 7,257,292 B2 * | 8/2007 | Sugawara et al. ........... 398/147 |
| 7,512,344 B2 * | 3/2009 | Sugawara et al. ........... 398/147 |
| 2002/0044738 A1 * | 4/2002 | Jablonski et al. .............. 385/27 |
| 2006/0013529 A1 * | 1/2006 | Sugawara et al. ............. 385/27 |

FOREIGN PATENT DOCUMENTS

| JP | 10-221658 | 2/1997 |
|---|---|---|
| JP | 2004-191521 | 12/2002 |
| JP | 2004-228925 | 1/2003 |
| JP | 2006-053519 | 2/2005 |
| JP | 2006-221075 | 2/2005 |

\* cited by examiner

*Primary Examiner*—Nathan M Curs
(74) *Attorney, Agent, or Firm*—Stites & Harbison PLLC; Juan Carlos A. Marquez, Esq.

(57) ABSTRACT

The present invention provides: (1) a compensator that compensates a wide range of amount of dispersion of light in a wide bandwidth band; and (2) a variable dispersion slope compensator applicable to the case where a transmission path suitable for a wavelength division multiplexing transmission system produces a wavelength dispersion slope.

33 Claims, 19 Drawing Sheets

FIG.8A
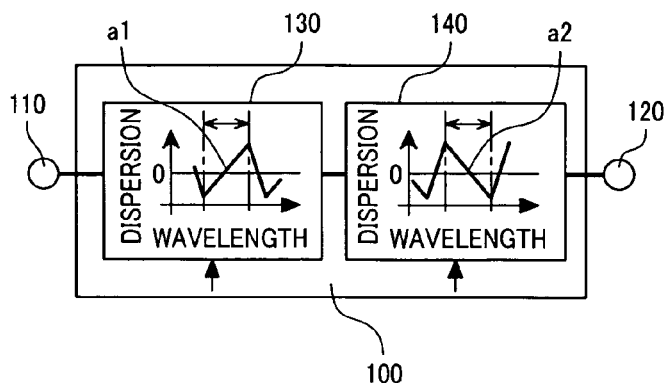
FIG.8B
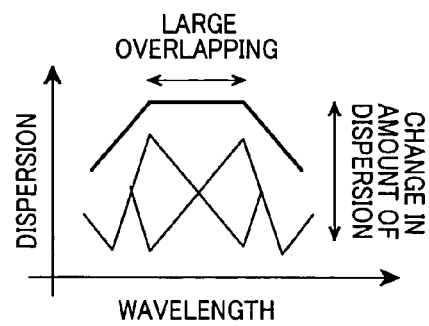
FIG.8C
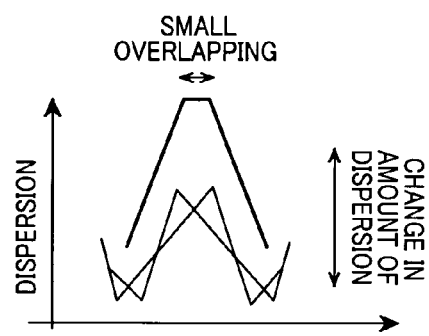
FIG.9A FIG.9B FIG.9C
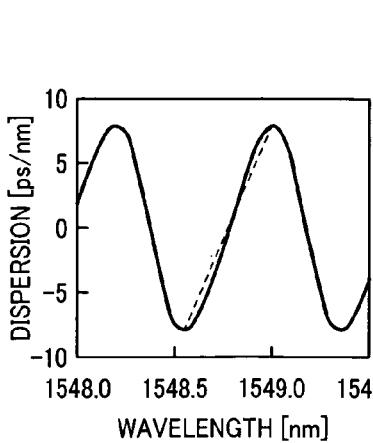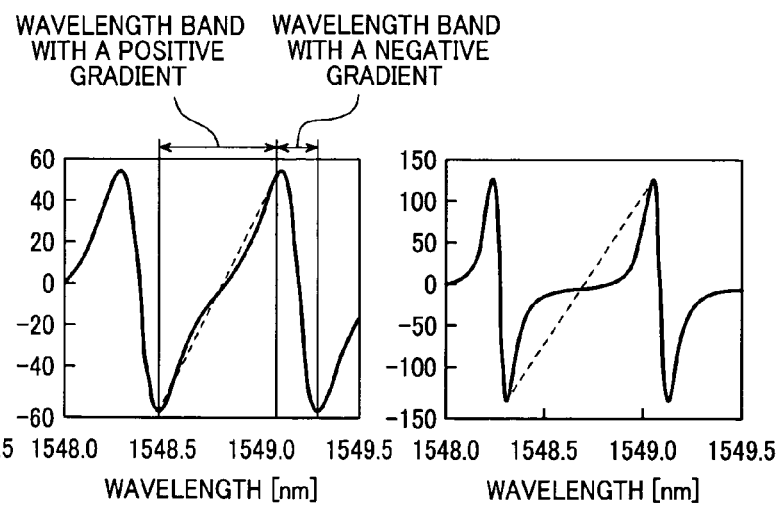

1H (1L 1H)$^6$ 12L 1H (1L 1H)$^{13}$ 14L 1H (1L 1H)$^{14}$ 14L
1H (1L 1H)$^{14}$ 14L 1H (1L 1H)$^{13}$ 12L 1H (1H 1L)$^7$ 1.88587H. 245L

VARIABLE DISPERSION COMPENSATOR

CLAIM OF PRIORITY

The present application claims priority from Japanese application JP 2005-371937, filed on Dec. 26, 2005, the content of which is hereby incorporated by reference into this application.

BACKGROUND OF THE INVENTION

1. Field of the Invention

The present invention relates to variable dispersion compensators, and more particularly, to an optical dispersion compensator suitable for application to optical transmission systems using optical fibers, and systems using an optical transmission scheme based on wavelength division multiplexing.

2. Description of the Related Art

In resent years, research and development have been conducted on long-distance optical transmission systems that use optical amplifiers as repeaters. It is considered to be particularly effective to increase a capacity using wavelength division multiplexing (WDM) technique. The WDM technique multiplexes a plurality of optical signals with different wavelengths over a single optical fiber used for a communications transmission line in order to support Internet-based multimedia services. In the long-distance optical transmission systems, transmission speeds and transmission distances are significantly limited by the wavelength dispersion of the optical fiber. The wavelength dispersion is a phenomenon in which light beams with different wavelengths are propagated through the optical fiber at different speeds. Since the optical spectra of the optical signals which have been modulated at a high speed have different wavelength components, the components are affected by the wavelength dispersion occurring during the propagation through the optical fiber and may not reach a receiver simultaneously. As a result, a distortion may be generated in the waveform of an optical signal after the transmission through the fiber.

The technique of dispersion compensation is important to reduce waveform deterioration due to such dispersion. Dispersion compensation is a technique for canceling unnecessary characteristics of wavelength dispersion of an optical fiber and thus preventing waveform deterioration. This technique is realized by disposing, at an optical transmitter, receiver, repeater or the like, an optical element that has wavelength dispersion characteristics opposite to those of the optical fiber used for a transmission line. Research and development have been conducted on the devices having such opposite dispersion characteristics, such as dispersion compensating fibers and optical fiber gratings (e.g., refer to Japanese Patent Laid-open No. 10-221658) used as such an optical element, that is, a dispersion compensator.

Dispersion tolerance indicates the range of the residual dispersion which satisfies certain transmission quality standards (i.e., the total amount of optical dispersion due to the transmission line fibers and the dispersion compensators). Since dispersion tolerance decreases in inverse proportion to the second power of the bit rate of an optical signal, the dispersion compensation technique becomes more important as the transmission speed increases. For example, in a 10-Gbps transmission system, the dispersion tolerance of optical signals is about 1000 ps/nm. Thus, in consideration of the fact that the amount of dispersion of a single-mode fiber (SMF) is about 17 ps/nm/km, the system can transmit an optical signal only over a distance of about 60 km without using the dispersion compensation technique. The dispersion tolerance in a 40-Gbps transmission system is about 60 ps/nm, which is about 1/16 of that in the 10-Gbps transmission system. Thus, in an SMF, an optical signal can be transmitted only over a distance of about 4 km.

The transmission distances of currently used trunk optical fiber transmission lines with use of optical repeaters are from several tens of kilometers to several thousands of kilometers. The amount of dispersion compensation of the dispersion compensator used, however, needs to be changed according to the transmission distance. For a 10-Gbps transmission system, for example, a dispersion compensator having a prefixed amount of dispersion compensation has been prepared for each 100 ps/nm to several hundreds of ps/nm in consideration of the dispersion tolerance, and has been installed after determining the appropriate amount of dispersion compensation according to the transmission distance. In this case, the dispersion compensator typically uses a dispersion compensation fiber having wavelength dispersion of a sign opposite to that of the transmission line. Likewise, it is considered to be necessary for a 40-Gbps transmission system to install a dispersion compensator capable of changing an amount of dispersion compensation for each 5 ps/nm to several tens of ps/nm. The amount of dispersion compensation corresponds to a transmission distance of several hundred meters in the case of using a SMF. Thus, if a dispersion compensator with a fixed dispersion compensation is used, it is required to prepare a dispersion compensator based on the transmission distance. In addition, in this case, changes in the amount of wavelength dispersion due to changes in the temperature of the transmission line fiber cannot be ignored. It is therefore required to provide a dispersion compensator capable of variably controlling an amount of dispersion.

SUMMARY OF THE INVENTION

The above-described conventional dispersion compensators, however, pose various problems. To compensate a fixed amount of dispersion, it is required to use a dispersion compensation fiber as long as several kilometers to several hundreds of kilometers. This increases the fiber accommodation space required. Also, an extra optical amplifier may be required to compensate the loss of light in the dispersion compensation fiber. Additionally, since the dispersion compensation fiber is generally small in mode field diameter, the fiber may produce a significant nonlinear effect in the fiber and thus distort transmission waveforms.

In optical fiber gratings, since a ripple is present for a wavelength in the transmission characteristics and wavelength dispersion characteristics, the ripple greatly varies compensation characteristics even if the wavelength slightly changes. It is therefore known that the optical fiber gratings are inferior to dispersion compensation fibers in transmission characteristics when used for dispersion compensation. Also, there are manufacturing related problems in that optical fiber gratings for a large amount of dispersion or a wide wavelength band cannot be easily produced and in that optical fiber gratings for a narrow wavelength band require stability in temperature and in wavelength. In a dispersion compensation fiber, the amount of dispersion cannot be made continuously variable in principle. In addition, it is difficult to realize the variable dispersion compensation that continuously changes the amount of dispersion according to the change in the amount of dispersion in the transmission line.

For optical fiber gratins, a technique has been proposed for dispersion compensated transmission with a chirped grating formed by, for example, applying a temperature gradient to an optical fiber in the longitudinal direction, such as the above-mentioned invention, as a method to realize continuously variable dispersion compensation using an optical fiber grating. In this example, a variable amount of dispersion can be compensated by controlling the temperature gradient. This scheme, however, has problems related to its practical use, since it is difficult to obtain a uniform temperature gradient and since it is not possible to attain sufficient performance of dispersion compensation for reasons such as the occurrence of a ripple in wavelength dispersion.

In addition, it is desirable that a variable dispersion compensator be capable of collectively compensating an amount of dispersion for wavelength transmission. If a dispersion compensator uses a resonator structure, for example, the dispersion characteristics include a free spectral range (FSR). If the optical frequency interval of an optical signal used in a WDM transmission system is set based on the free spectral range and dispersion can be compensated before branching a light beam, it is only necessary to install a single dispersion compensator in the system. If dispersion of an optical signal cannot be collectively compensated in a WDM transmission system, on the other hand, it is required to install dispersion compensators in front of each receiver, which makes it difficult to build an economical system.

Even if a variable dispersion compensator can collectively compensate dispersion of an optical signal in a WDM transmission system, it may pose the problem of a dispersion slope (high order dispersion) of an optical fiber. An SMF (Single Mode Fiber), which is widely used for optical communication, has a dispersion slope of 0.05 to 0.10 ps/nm$^2$/km. FIG. 1 shows a dispersion slope of an SMF with a length of 80 km. As shown in FIG. 1, if the wavelength is widely ranged, the amount of the dispersion is varied. This clarifies the presence of the dispersion slope.

When the WDM transmission system is used, its wavelength range is determined based on a wavelength range in which wavelengths can be amplified in an optical repeater. In the case of using an erbium-doped fiber which is widely used as an optical repeater, the wavelength range in which wavelengths can be amplified is C band of 1530 to 1570 nm and L band of 1570 to 1610 nm. If dispersion of an optical signal is compensated in a WDM transmission system, the difference between the amounts of dispersion in both ends of a wavelength band cannot be ignored in the case where the fiber length is long to some extent even in a metro network. For example, when dispersion slope is 0.075 ps/nm$^2$/km and the SMF length is 80 km, the difference between the amounts of dispersion in both ends of C band is expressed by the following formula:

(1570−1530)×0.075×80≈180 ps/nm

Therefore, if dispersion of an optical signal is collectively compensated in a WDM transmission system, it is important to install a variable dispersion slope compensator capable of compensating the difference between the amounts of dispersion in a wavelength band due to dispersion slope.

An object of the present invention is to provide a variable dispersion compensator capable of solving the above problems, reducing dispersion ripples, and minimizing optical losses and loss ripple, in a wide wavelength band. Another object of the present invention is to provide a variable dispersion compensator capable of compensating a dispersion slope.

The above objects can be attained by providing the following variable dispersion compensators.

1) A variable dispersion compensator comprising a first variable dispersion compensating unit, a second variable dispersion compensating unit, and a third variable dispersion compensating unit. The first variable dispersion compensating unit has a first optical resonator that receives a light beam emitted from a collimator and a first mirror disposed with a predetermined angle relative to the first optical resonator. The first variable dispersion compensating unit reflects a light beam $n_1$ times ($n_1$ is a counting number). The second variable dispersion compensating unit has a second optical resonator that receives the light beam emitted from another collimator and a second mirror disposed with a predetermined angle relative to the second optical resonator. The second variable dispersion compensating unit reflects the light beam $n_2$ times ($n_2$ is a counting number). The third variable dispersion compensating unit has a third optical resonator that receives a light beam emitted from another collimator. The first and the second optical resonators each have a first plane surface and a second plane surface. The first plane surface and the second plane surface are opposed to each other. The reflectance of the first plane surface is equal to or more than 90% and equal to or less than 100%. The reflectance of the second plane surface is smaller than that of the first plane surface. When the shortest wavelength in the range of wavelengths of a multiplexed optical signal incident on the second plane surface is a first wavelength, and the longest wavelength in the above wavelength range is a second wavelength, the reflectance of a light beam with the first wavelength is different from that of a light beam with the second wavelength on the second plane surface. A filter is provided on the second plane surface. The filter is designed such that the value of the reflectance is monotonously increased or monotonously decreased between the first and second wavelengths. The first, second and third variable dispersion compensating units are cascade-connected.

2) Another variable dispersion compensator comprising at least four variable dispersion compensating units. Each of the variable dispersion compensating units has an optical resonator that receives a light beam emitted from a collimator and a mirror disposed with a predetermined angle relative to the optical resonator. Each of variable dispersion compensating units reflects a light beam n times (n is a counting number). The optical resonators included in each of variable dispersion compensating units each have a first and second plane surfaces which are opposed to each other. The reflectance of the first plane surface is equal to or more than 90% and equal to or less than 100%. The reflectance of the second plane surface is smaller than that of the first plane surface. When the shortest wavelength in the range of wavelengths of a multiplexed optical signal incident on the second plane surface is a first wavelength, and the longest wavelength in the above wavelength range is a second wavelength, the reflectance of a light beam with the first wavelength is different from that of a light beam with the second wavelength on the second plane surface. A filter is provided on the second plane surface. The filter is designed such that the reflectance is monotonously increased or monotonously decreased between the first and second wavelengths. At least two of the at least four variable dispersion compensating units are cascade-connected to form a plus-side variable dispersion compensating unit. At least two of the other variable dispersion compensating units than those forming the plus-side variable dispersion compensating unit are cascade-connected to form a minus-side variable dispersion compensating unit. The plus-side and minus-side variable dispersion compensating units are cascade-connected.

3) Another variable dispersion compensator comprising a first variable dispersion compensating unit, a second variable dispersion compensating unit, and a third variable dispersion compensating unit. The first variable dispersion compensating unit has a first optical resonator that receives a light beam emitted from a collimator and a first mirror disposed with a predetermined angle relative to the first optical resonator. The first variable dispersion compensating unit reflects the optical beam $n_1$ times ($n_1$ is a counting number). The second variable dispersion compensating unit has a second optical resonator that receives the light beam emitted from another collimator and a second mirror disposed with a predetermined angle relative to the second optical resonator. The second variable dispersion compensating unit reflects the light beam $n_2$ times ($n_2$ is a counting number). The third variable dispersion compensating unit has a third optical resonator that receives the light beam emitted from another collimator. The first and the second optical resonators each have a first plane surface and a second plane surface. The first plane surface and the second plane surface are opposed to each other. The reflectance of the first plane surface is equal to or more than 90% and equal to or less than 100%. The reflectance of the second surface is smaller than that of the first plane surface. The second plane surface is formed of a filter having a reflectance that is varied in a predetermined wavelength range. The filter has a first reflectance for a first wavelength, a second reflectance for a second wavelength longer than the first wavelength, a third reflectance for a third wavelength longer than the second wavelength, and a fourth reflectance for a fourth wavelength longer than the third wavelength, in the predetermined wavelength range. The first reflectance is larger than the second reflectance, and the third reflectance is less than the fourth reflectance. The rate of the absolute value of the difference between the first and fourth reflectances relative to the first reflectance is larger than 0% and equal to or less than 5%. The rate of the absolute value of the difference between the second and third reflectances relative to the second reflectance is equal to or larger than 0% and equal to or less than 5%. The value of the reflectance in the range from the first wavelength to the second wavelength is monotonously decreased. The value of the reflectance in the range from the third wavelength to the fourth wavelength is monotonously increased. The first, second, and third variable dispersion compensating units are cascade-connected.

The present invention makes it possible to provide a variable dispersion compensator that has characteristics of a large amount of dispersion, a wide wavelength band, and a low group-delay ripple. In addition, the present invention is capable of compensating a dispersion slope and collectively compensating dispersion of an optical signal in a WDM transmission system.

BRIEF DESCRIPTION OF THE DRAWINGS

FIG. 8A is a diagram showing a basic configuration of the variable dispersion compensator of the present invention;

FIGS. 8B and 8C are graphs schematically showing how amounts of dispersion change during temperature control.

FIGS. 9A through 9C are graphs showing dispersion characteristics in the case where only the etalon is used (without using a mirror) with amplitude reflectance r varied, the etalon used as a basic element of the variable dispersion compensator according to the present invention.

DESCRIPTION OF THE PREFERRED EMBODIMENTS

Embodiments of the present invention will be described in detail hereunder with reference to the accompanying drawings.

Figure 2:
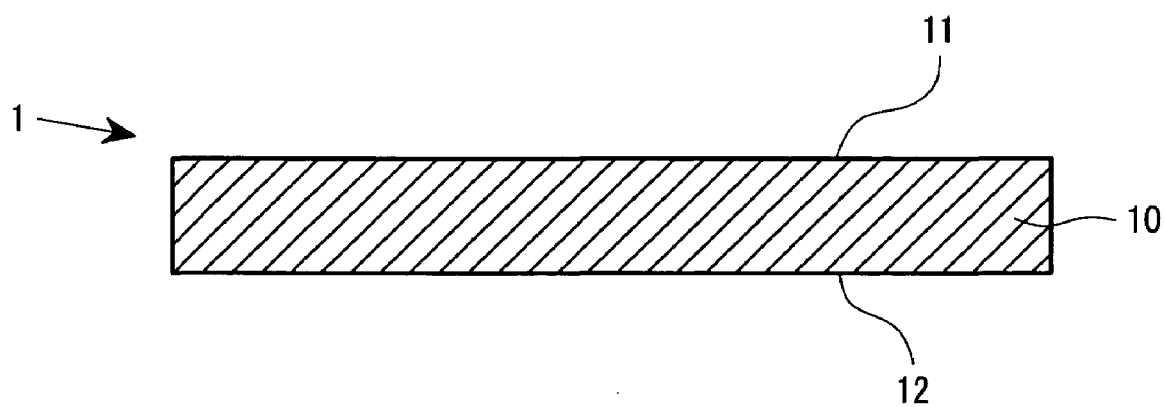
FIG. 2 illustrates an etalon which is a basic element of a variable dispersion compensator according to the present invention.

First, a description will be made of an etalon. FIG. 2 shows a cross-sectional structure of the etalon. Reference number 1 denotes the etalon. The etalon includes a planar plate 10 whose upper and lower surfaces are precisely parallel to each other and have reflection films 11 and 12 coated thereon. The reflection films may uses metal films made of a high-reflectance metallic material such as gold and silver, a dielectric multi-layer film, or the like. In particular, ideally, an etalon has an amplitude reflectance of 100% on its one surface. Such an etalon is called the GT etalon, which was named after Gires and Tournois, the proposers. In fact, however, it is difficult to obtain an amplitude reflectance of 100%. Thus, the reflection films may be allowed to have an amplitude reflectance of at least about 90%.

In addition, the amplitude reflectance of the reflection film on the other side does not need to be too high when the film is to be used for dispersion compensation, and does not exceed 90%. The detail value will be described later. Since the GT etalon as mentioned above has a constant transmissivity with respect to wavelength (frequency), this etalon is called an all-pass filter. However, this etalon has wavelength (or frequency) dependence with respect to phases (or group delay times). The group delay time "τ" in this case is represented by the following expression (1):

$$\tau = \frac{\Delta T(1-r^2)}{1+r^2+2r\cos(\omega\Delta T+\phi)} \quad (1)$$

where, "r" is an amplitude reflectance; "ω", an angular frequency of light; and "ΔT", a optical delay due to a round-trip of light traveling from and to the parallel planar plate. The angular frequency "ω" has the relationship of ω=2πf, where "f" is a frequency. A wavelength λ is expressed as λ=c/f=2πc/ω, using a light velocity "c". Wavelength dispersion D is obtained by, as shown in expression (2), differentiating the group delay time "τ" with respect to the wavelength.

$$D = \frac{d\tau}{d\lambda} \quad (2)$$

Figure 3:
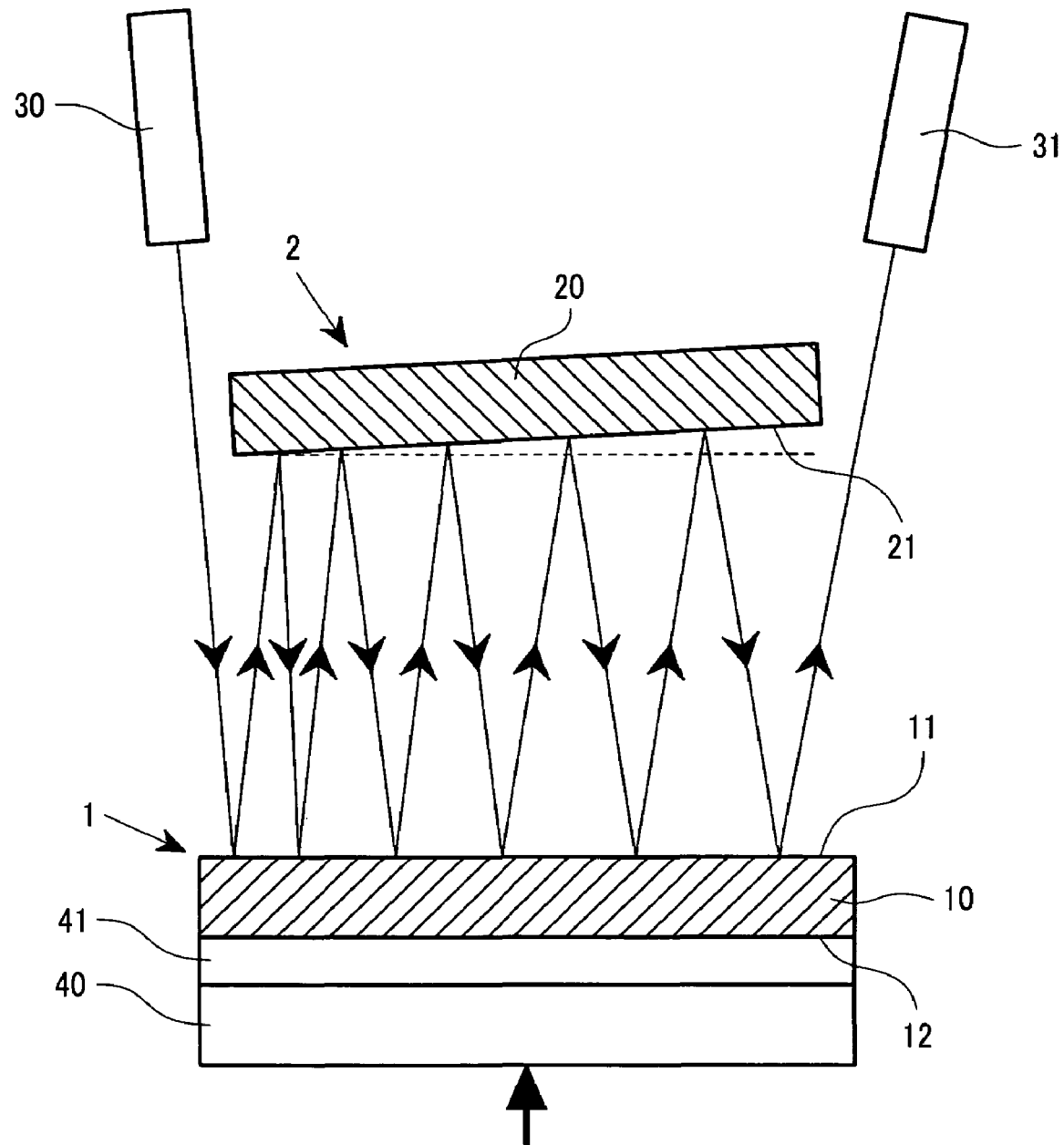
FIG. 3 is a diagram showing an example in which a mirror slightly angled relative to the etalon is used to reflect a light beam a plurality of times.

To obtain high-speed signals, it is important to ensure a wide effective band of at least 40 GHz, a wide variable dispersion range, and a minimum dispersion ripple, especially for a dispersion compensator in a 40-Gbps long-distance optical transmission system. To obtain desired characteristics of a dispersion compensator, therefore, it is effective to reflect light a plurality of times using a mirror, as shown in FIG. 3. In a configuration diagram of FIG. 3, a mirror 2 (formed by coating a mirror substrate 20 with a high-reflectance reflection film 21) is disposed in parallel to or with a slight angle to the etalon 1 described above with reference to FIG. 2. As the detail value will be shown hereinafter, the angle of about 1 degree or less makes it possible to obtain the effect of an increase of the effective wavelength band according to the present invention. Light emitted from a collimator 30 is reflected alternately between the etalon 1 and the mirror 2 and then enters a collimator 31. A collimator is an optical component designed so that light propagating through an optical fiber is spatially emitted as a parallel beam. The etalon 1 can control its own temperature using a temperature-control element 40 (e.g., a Peltier element in heater). In order to obtain a uniform heat distribution of the etalon in the above case, a heat transfer material 41 is interposed between the temperature-control element 40 and the etalon 1. A heat transfer sheet or thermal grease is used as the heat transfer material.

Figure 4A:
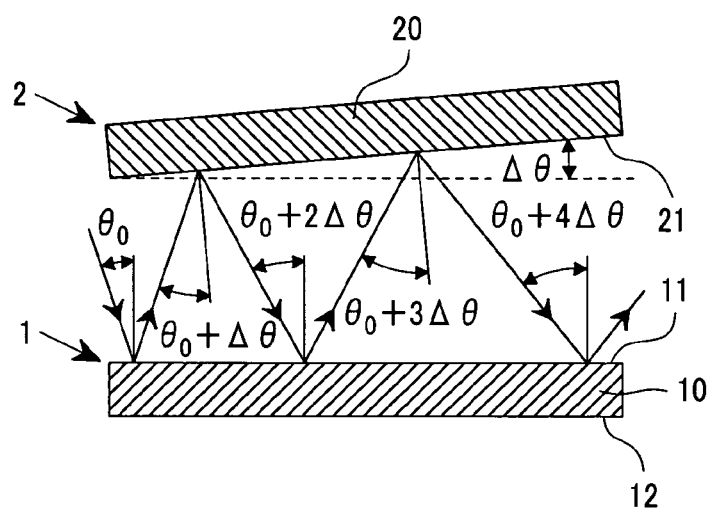
FIGS. 4A and 4B are reference diagrams to explain etalon-based group delay characteristics using numerical expressions.
Figure 4B:
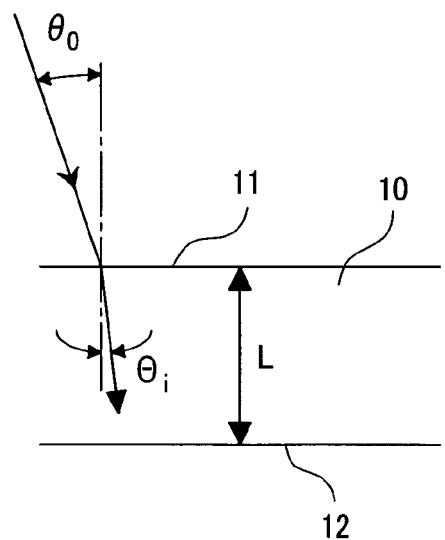

A description will now be made of group delay characteristics using numerical expressions with reference to FIGS. 4A and 4B. As shown in FIG. 4A, when an inclination angle of the reflection film 21 disposed on the mirror 2 with respect to the reflection film 11 formed on the etalon 1 is taken as Δθ, light that has entered at an incident angle θ$_o$ with respect to the etalon 1 is reflected on the mirror 2 an "i" number of times and then re-enters the etalon 1 at an angle of θ$_i$=θ$_o$+2iΔθ. If the number of reflections on the mirror 2 is "k", a group delay time τ$_{total}$ of the entire compensating unit can be obtained by totaling group delay times τ$_i$ of (k+1) times of reflections on the etalon. Expression (3) below shows the group delay time τ$_{total}$.

$$\tau_{total} = \sum_{i=0}^{k} \tau_i \quad (3)$$

$$= \sum_{i=0}^{k} \frac{\Delta T_i(1-r^2)}{1+r^2+2r\cos(\omega\Delta T_i+\phi)}$$

where, ΔT$_i$ is an optical delay due to the delay of a round-trip of light traveling from and to the parallel planar plate with respect to each of the reflections on the etalon 1. In consideration of incident angle Θ$_i$ with respect to the etalon 1, as shown in FIG. 4B, ΔT$_i$ is represented by expression (4):

$$\Delta T_i = \frac{2nL\cos\Theta_i}{c} \quad (4)$$

where, $\Theta_i$ is the angle of incidence on the etalon 1; "n", a refractive index; and L, a spacing between the reflection films of the etalon. The relationship between the incident angle $\Theta_i$ within the etalon and the incident angle $\theta_i$ on the etalon is represented by numerical expression (5).

$$n\sin\Theta_i = \sin\theta_i \quad (5)$$

Figure 5:
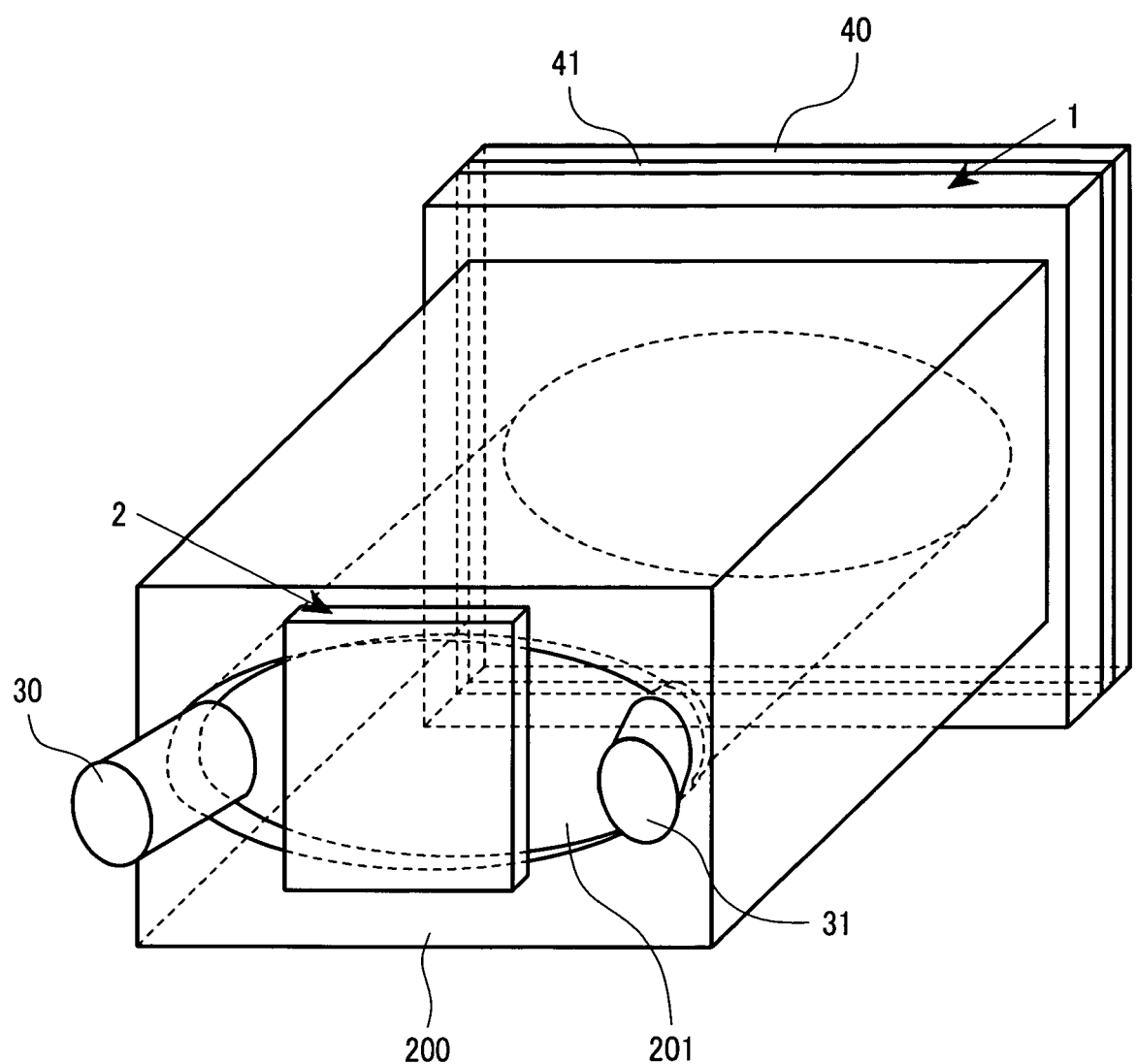
FIG. 5 is a perspective view showing an example of using an optical components fixing member to control and fix the etalon, mirror, and two collimators installed in the variable dispersion compensator of the present invention.
Figure 6:
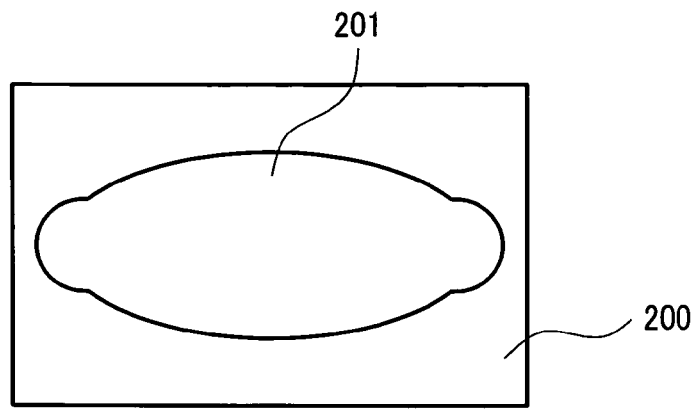
FIG. 6 is a top view of the optical components fixing member of FIG. 5.
Figure 7:
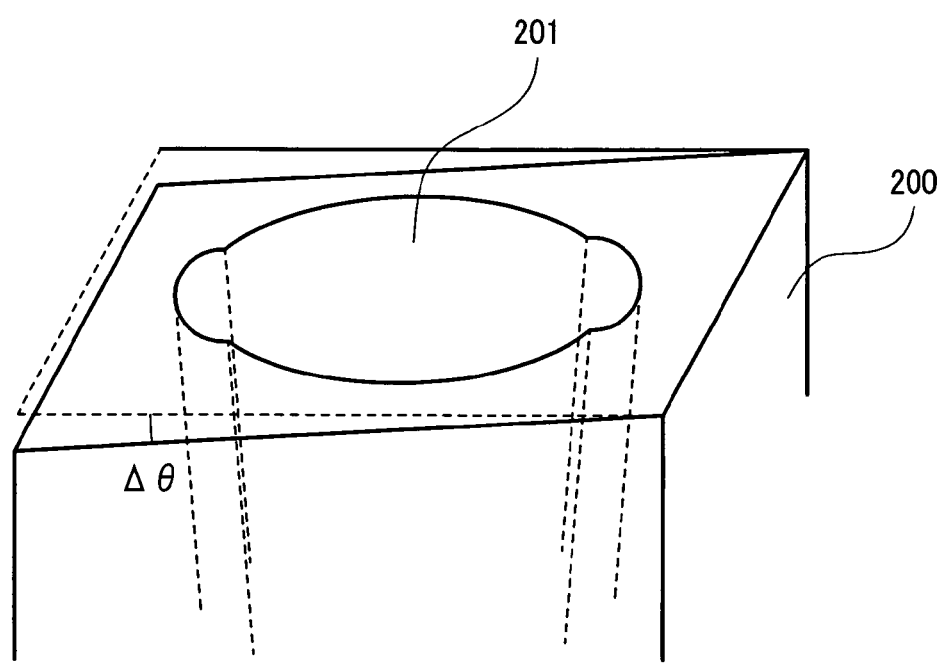
FIG. 7 is a perspective view showing an example of processing an upper face of the optical components fixing member in order to give an angle relative to the etalon and mirror of FIG. 5.

FIG. 5 shows a method of controlling and fixing the etalon 1, the mirror 2, and the collimators 30, 31, by means of an optical components fixing member 200. The optical components fixing member 200 is realized using a metallic or glass material having a low thermal expansion coefficient. The optical components fixing member 200 is hollow and can be created by processing with an ultrasonic drill or the like. FIG. 6 is a top view of the optical components fixing member 200, and FIG. 7 is an oblique top view of the optical components fixing member 200. As shown in FIG. 6, the shape of a hollow hole 201 in the optical components fixing member 200 is like a shape formed by combining an elliptical hole and two circle holes, the elliptical hole being for passing light that is reflected between the etalon 1 and the mirror 2, the two circle holes being for fixing the collimators 30 and 31. Also, as shown in FIG. 7, the angle $\Delta\theta$ formed between the etalon 1 and the mirror 2 can be fixed through precise control by obliquely grinding an upper portion of the optical components fixing member 200. In addition, the incident angle $\theta_o$ on the etalon 1 from the collimator 30 can be fixed through precise control by precisely processing the collimator-fixing holes in a manner similar to the above. These optical components are fixed using an adhesive for optical components or the like.

FIGS. 8A, 8B and 8C show an example of a variable dispersion compensation scheme that uses temperature control. As shown in FIG. 8A, a variable dispersion compensator 100 has an input port 110 and an output port 120. Also, the variable dispersion compensator 100 has a plus-side variable dispersion compensating unit (D+) 130 and a minus-side variable dispersion compensating unit (D−) 140 formed therein. The plus-side variable dispersion compensating unit (D+) 130 corresponds to the first variable dispersion compensating unit, and the minus-side variable dispersion compensating unit (D−) 140 corresponds to the second variable dispersion compensating unit. The plus-side variable dispersion compensating unit (D+) 130 and the minus-side variable dispersion compensating unit (D−) 140 are cascade-connected. These compensating units are realized by adopting the configuration shown in FIG. 3, that is, the configuration in which the mirror 2 is disposed to be oblique to or opposed in parallel with the etalon 1 and a laser beam emitted from the collimator 30 is obliquely reflected a plurality of times. As shown in FIG. 8A, the plus-side variable dispersion compensating unit 130 uses a linear function having a positive dispersion slope between dashed lines indicated with an arrow in the relationship between the dispersion and the wavelength, whereas the minus-side variable dispersion compensating unit 140 uses a linear function having a negative dispersion slope between dashed lines indicated with an arrow in the relationship between the dispersion and the wavelength.

When the temperature of the etalon is changed, the resonance wavelength is changed due to thermal expansion of the etalon substrate. For this reason, the dispersion characteristics curve shown in FIG. 8A is shifted (translated) in the wavelength direction. For control of the resonance wavelength in this case, it is desirable that the etalon substrate be formed of a glass member whose thermal expansion coefficient is equal to or less than $1\times10^{-4}$ and equal to or more than $1\times10^{-6}$. Under the conditions used for this evaluation, if a boronsilicate glass, which is commonly used as an optical glass, is applied as a substrate material and the boronsilicate glass has a thermal expansion coefficient of $0.87\times10^{-5}/°$ C., the temperature needs to be changed 60° C. in order to shift a frequency of 100 GHz (in terms of optical wavelength, approx. 0.8 nm) with respect to the dispersion characteristics. Since a single variable dispersion compensator requires a wavelength shift of at least about 10 GHz, a preferable temperature control range is 5° C. or more. The detail value will be shown later. If the plus-side variable dispersion compensating unit 130 and minus-side variable dispersion compensating unit 140 are adapted to be temperature controllable independently of each other, dispersion characteristics of the entire variable dispersion compensator become equal to the total amount of the dispersion characteristics values of the two compensating units.

Specifically, as shown in FIG. 8B, if the linear section with the positive dispersion slope and the linear section with the negative dispersion slope are overlapped with each other in a wide wavelength range, the dispersion characteristics curve has a wide and low upper flat section. On the other hand, as shown in FIG. 8C, if the overlapping range of the linear section with the positive dispersion slope and the linear section with the negative dispersion slope is in a narrow wavelength range, the dispersion characteristics curve has a narrow and high upper flat section. As understood from the above, the amount of dispersion can be changed by controlling the temperatures of the plus-side and minus-side variable dispersion compensating units.

A description will now be made of a method for optimizing the angle $\Delta\theta$ of the mirror 2 relative to the etalon 1 and the amplitude reflectance "r" of the etalon to obtain the ideal characteristics of the plus-side and minus-side variable dispersion compensating units. First, a description will be made of the dispersion characteristics of the etalon in the case of using only the etalon with the amplitude reflectance "r" being varied, which is 5%, 26% and 40%. FIGS. 9A, 9B and 9C show dispersion characteristics with respect to wavelengths where k=0 and "r"=5%, 26%, and 40%, respectively, in the expression (3). In FIG. 9A, "r"=5%, and the amplitude of the dispersion is small, forming a shape like a sine function. In FIG. 9B, "r"=26%, and the amplitude of the dispersion is slightly larger than that in FIG. 9A, forming a shape like a triangular waveform. This is close to the shape indicating the characteristics of the plus-side variable dispersion compensating unit 130 that were described earlier with reference to FIG. 8. In the following description, the curve is divided into a section having a positive dispersion slope and a section having a negative dispersion slope. In addition, the range in which the dispersion changes from the minimum to the maximum will be called the "wavelength band with a positive dispersion slope", and the range in which the dispersion changes from the maximum to the minimum will be called the "wavelength band with a negative dispersion slope". In FIG. 9C, "r"=40%, the amplitude of the dispersion is large, and the linear section shown in FIG. 9B has a distorted shape. In FIGS. 9A through 9C, broken lines show a line connected with positive and negative peaks of the dispersion in a region corresponding to the wavelength band with a positive dispersion slope. It is noted that in FIGS. 9A through 9C, although the horizontal axes have the same wavelength scale, the vertical axes have different dispersion amount scales from each other.

As can be seen from FIGS. 9A through 9C, dispersion compensators using a GT etalon exhibit wavelength (or frequency) periodicity in group delays and dispersion characteristics. This periodicity is expressed as a FSR, which is 100 GHz (approx. 0.8 nm) in FIGS. 9A through 9C. It is particularly effective in wavelength division multiplex (WDM) transmission to provide such frequency periodicity. If the FSR is made equal to the wavelength interval in WDM transmission, the GT etalon can provide essentially the same advantageous effects to signals of all wavelengths. Therefore, such a dispersion compensator is very effective in a WDM optical transmission system. With the above-described properties in view, a description is given below of a configuration to realize a plus-side and minus-side variable dispersion compensating units.

Figure 10A:
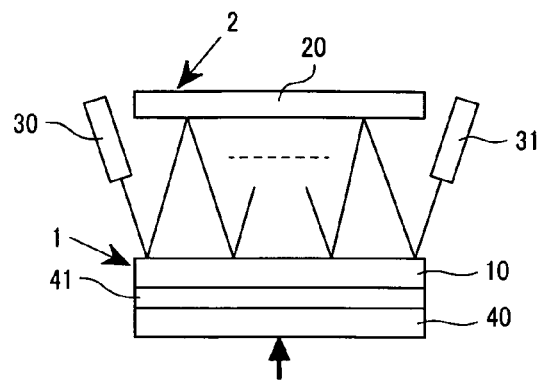
FIG. 10A is a diagram showing an example of a configuration in which the mirror and the etalon are arranged to be opposed in parallel with each other in order to reflect a beam bidirectionally for an increased amount of dispersion.
Figure 10B:
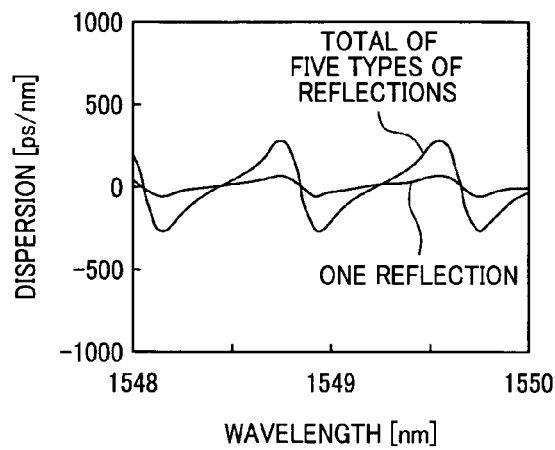
FIG. 10B is a graph showing the dispersion characteristics that increase the amount of dispersion as the number of reflections is increased.

First, an etalon with an amplitude reflectance "r" of about 26% (as can be seen from FIG. 9B, such an etalon has high linearity in inclined sections with a positive dispersion slope) is used. As shown in FIG. 10A, the mirror 2 is disposed to be opposed in parallel to the etalon to reflect a light beam back and forth between the etalon 1 and the mirror 2 for increased amounts of dispersion. The dispersion characteristics obtained with the above arrangement are shown in FIG. 10B. FIG. 10B is a graph showing the amounts of dispersion in the case where a light beam is reflected once and the amounts of dispersion in the case where a light beam is reflected five times. As can be seen from the FIG. 10B, as the number of reflections increases, the amount of dispersion is larger and the positive dispersion slope is also larger.

In order for the variable dispersion compensator 100 to have flat dispersion characteristics in an effective wavelength band, dispersion slopes of the linear sections in dispersion characteristics curves of the plus-side variable dispersion compensating unit 130 and minus-side variable dispersion compensating unit 140 need to be opposite in sign to one another and need to be the same in size. It is therefore necessary, after determining the configuration of the plus-side variable dispersion compensating unit 130, to determine an amplitude reflectance of the etalon forming the minus-side variable dispersion compensating unit 140 and the number of reflections of a light beam on the etalon.

Figure 11A:
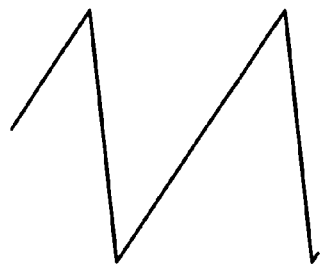
FIGS. 11A through 11C are diagrams explaining a concept adopted to apply a basic nature of triangular waves in order to achieve ideal characteristics in a minus-side variable dispersion compensating unit according to the embodiment of the present invention.
Figure 11B:
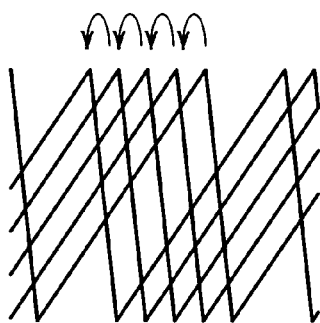
Figure 11C:
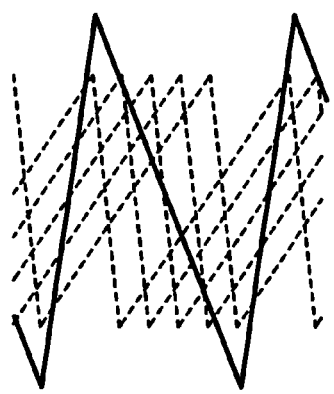

A description will now be made of a method for realizing the minus-side variable dispersion compensating unit 140. FIGS. 11A to 11C are diagrams explaining a concept of applying the basic nature of triangular waves to realize ideal characteristics in the minus-side variable dispersion compensating unit. FIG. 11A is a diagram showing a triangular wave with a positive dispersion slope in a wide wavelength band, which corresponds to the characteristics described with reference to FIG. 9B. FIG. 11B shows a plurality of triangular waves drawn by slightly and stepwisely shifting the peak position of the triangular wave shown in FIG. 11A (i.e., by shifting the triangular wave in the wavelength axis direction in the figure). In FIG. 1C, the multiple triangular waves shown in FIG. 11B are each drawn with broken lines, and the solid line indicates a waveform obtained by totaling the values of the triangular waves. As can be easily seen by comparing the waveform shown in FIG. 11A and the waveform drawn with the solid line in FIG. 11C, the wavelength band with a positive dispersion slope is decreased and the wavelength band with a negative dispersion slope is increased. In this case, the optimum shift amount for maximizing the wavelength band with the negative dispersion slope is uniquely determined by the number of additions of the triangular wave values and the wavelength band with the positive dispersion slope.

The peak position can be more easily shifted using the same method as that of shifting by lowering the temperature of the etalon in the post-compensating section of the plus-side variable dispersion compensating unit 130. That is, it is possible to provide a large number of the configurations described with reference to FIG. 10 and control the temperature of each etalon. In this case, however, the optical loss increases and the number of components required also increases.

Figure 12A:
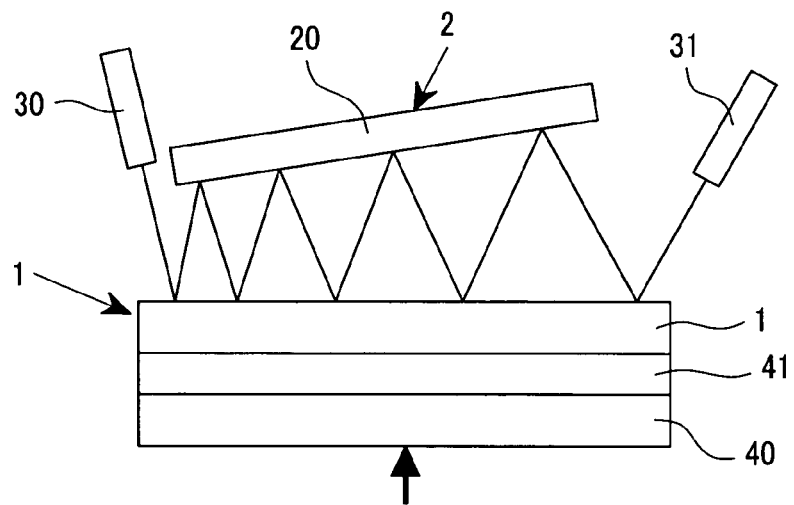
FIG. 12A is a diagram showing a configuration in which the concept described in FIGS. 11A through 11C is realized with an etalon oblique reflection scheme.
Figure 12B:
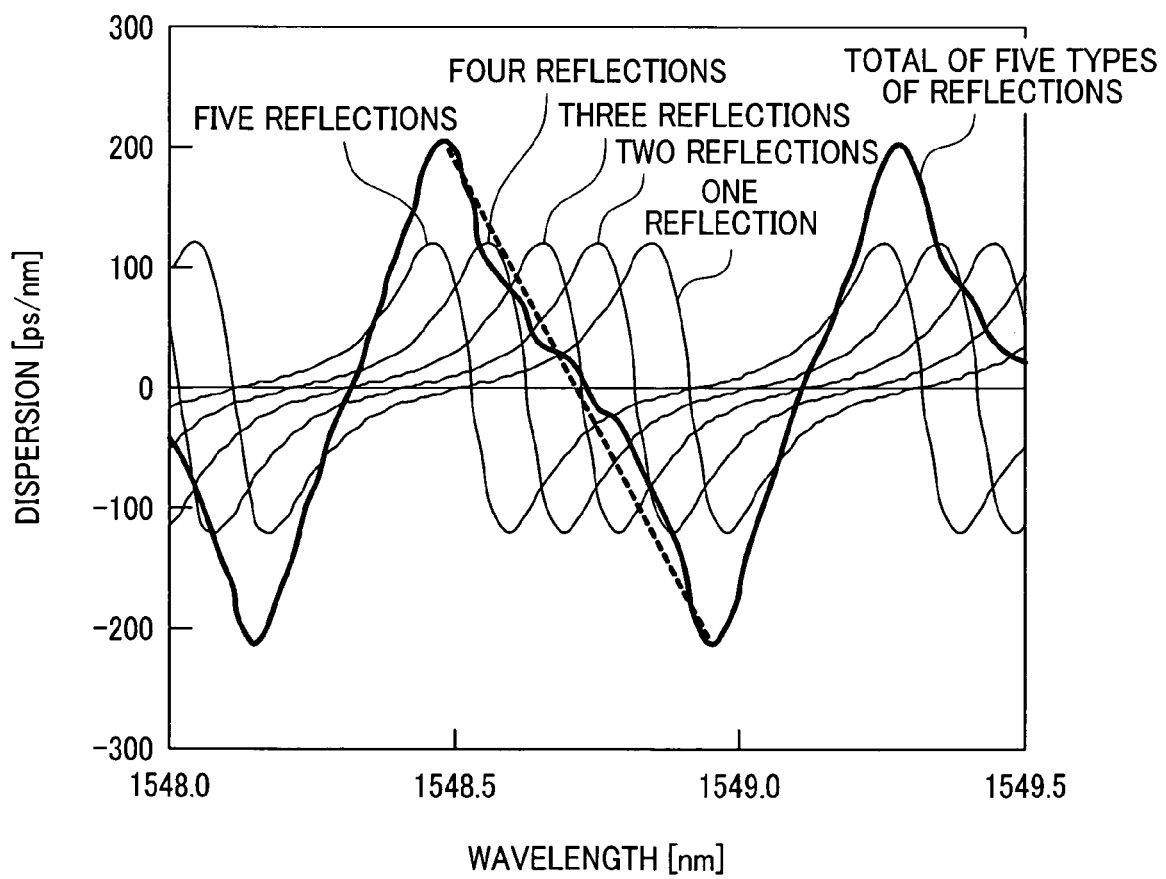
FIG. 12B is a graph showing the dispersion characteristics obtained.

Another method of shifting the peak position is to give a slight angle of the mirror 2 relative to the etalon 1 (which is the etalon oblique reflection scheme according to the present invention) and total the dispersion characteristics while gradually shifting the peak position for each reflection. Thus, the wavelength band with a negative dispersion slope can be expanded. FIG. 12A shows a configuration for implementing the concept shown in FIGS. 11A to 11C, and FIG. 12B shows the dispersion characteristics obtained. In FIGS. 12A and 12B, it is assumed that the etalon 1 has an amplitude reflectance "r" of 40%. As shown in FIG. 12B, assigning a required angle of the mirror 2 relative to etalon 1 makes it possible to shift a peak position of dispersion characteristics independently for each reflection from a first reflection to a fifth reflection. It is possible, by totaling these dispersion characteristics, to obtain such characteristics as shown with a broken line in FIG. 12B, that is, characteristics close to those of the minus-side variable dispersion compensating unit 140 that have the negative dispersion slope shown in FIG. 8. Preferably, with study of triangular waves, the amount of shifting is determined based on the number of additions and the wavelength band of the positive dispersion slope in advance, and then the mirror angle and amplitude reflectance values that are likely to be usable in the etalon oblique reflection scheme are selected. Thus, the optimum amount of shifting can be calculated efficiently.

Compared with the ideal characteristics denoted with a broken line in FIG. 12B, the dispersion characteristics shown in FIG. 12B are distorted since the original characteristics of the etalon have distortion different from that of the triangular wave, as shown in FIG. 9C. To achieve a greater amount of dispersion in the etalon oblique reflection scheme of FIG. 12A, there are some methods: (1) a method of enhancing the amplitude reflectance "r" of the etalon; and (2) a method of adopting a multi-stage etalon oblique reflection scheme. The former is preferable in terms of losses. However, enhancing the amplitude reflectance "r" of the etalon will correspondingly increases distortion components in comparison with those of the triangular wave. Therefore, distortion will occur in the method of using the nature of the triangular wave, described with reference to FIGS. 11A to 11C.

Figure 13:
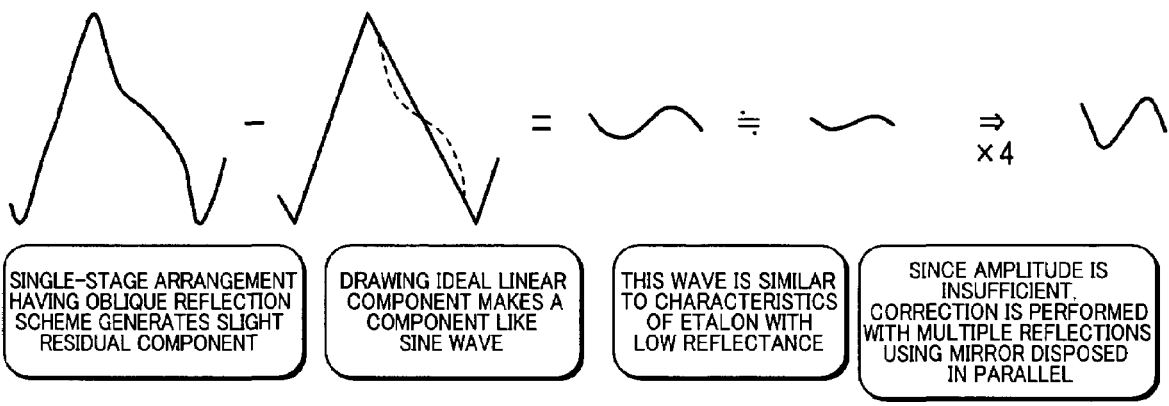
FIG. 13 is a diagram schematically explaining a method for representing the ideal characteristics of the minus-side variable dispersion compensating unit more accurately.

A description will now be made of a method for representing the ideal characteristics of the minus-side variable dispersion compensating unit 140 more accurately than in the configuration of FIG. 12A. FIG. 13 schematically explains the method. The first subtraction shown in FIG. 13 indicates that the differential component between the resulting waveform showing the total characteristics of five reflections shown in FIG. 12B and the triangular waveform having the ideal characteristics is close to a sine wave (the above differential component will be hereinafter called higher-order dispersion ripple). As is expressed using "≈", the higher-order dispersion ripple close to a sine wave is considered to have a shape close to that obtained when the etalon shown in FIG. 12A has a low amplitude reflectance (e.g., r=5%). As is expressed using "=>", therefore, the etalon with a low amplitude reflectance is disposed to be opposed in parallel to the mirror 2 to reflect a light beam multiple times and conduct corrections with an amplitude increased by a factor of four.

Figure 14A:
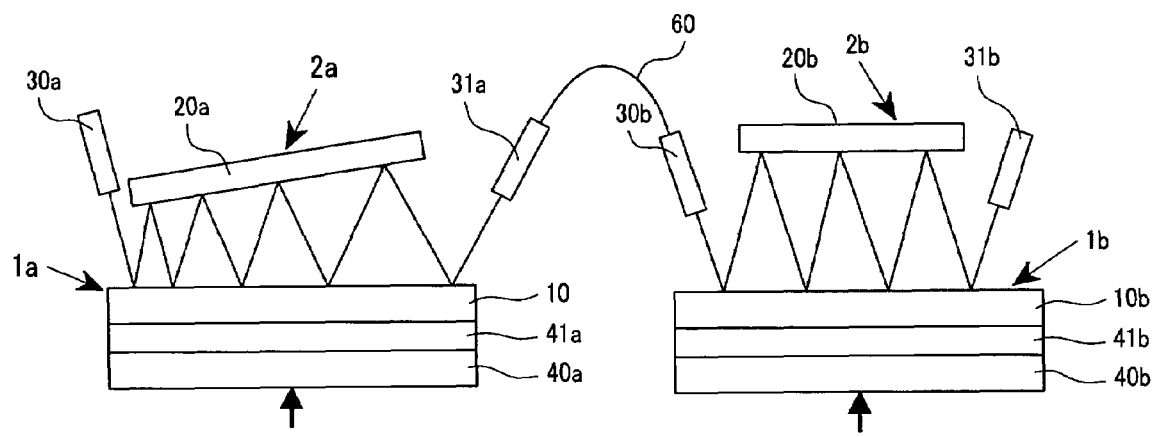
FIG. 14A is a diagram showing a configuration intended to realize the concept described in FIG. 13.
Figure 14B:
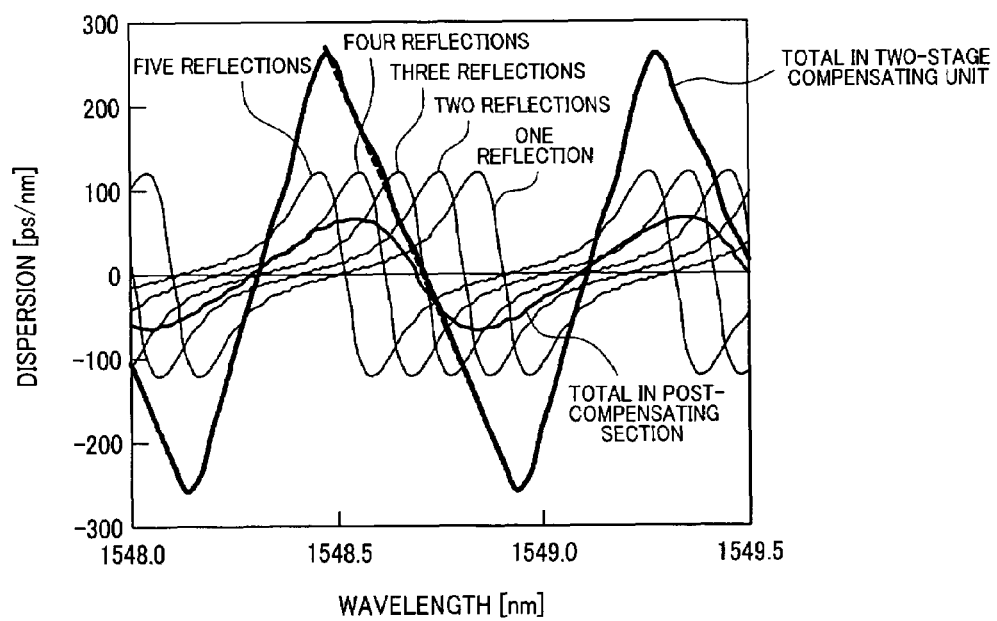
FIG. 14B is a graph showing dispersion characteristics obtained.

FIG. 14A shows a configuration for realizing the concept described above with reference to FIG. 13, and FIG. 14B shows the dispersion characteristics obtained. In the pre-dispersion compensating section of the etalon oblique reflection scheme, which is the left side of FIG. 14A, it is assumed that the angle formed between an etalon 1a and a mirror 2a is 0.051°. Also, assume that the etalon in the pre-dispersion compensating section has an amplitude reflectance "r" of 40% and the number of reflections of a light beam is five. The light beam is emitted from a collimator 31a of the pre-dispersion compensating section and enters a collimator 310b of a post-dispersion compensating section via a fiber 60. In addition, it is assumed that an etalon 1b and a mirror 2b in the post-dispersion compensating section are installed in parallel with each other and that the etalon 1b has an amplitude reflectance "r" of 10% and the number of reflections of the light beam is four. As shown in FIG. 14B, the dispersion characteristics obtained by one reflection to five reflections are obtained in the pre-dispersion compensating section, and the total in the post-dispersion compensating section shown in FIG. 14B is obtained in the post-dispersion compensating section. The total in the two-stage compensating section shown in FIG. 14B is obtained by totaling the dispersion characteristics obtained in the pre-dispersion compensating section and in the post-dispersion compensating section. The dispersion compensating characteristics curve indicated as the total in the two-stage compensating section shown in FIG. 14B substantially overlaps the broken line that depicts the ideal characteristics. This indicates that the linearity is significantly improved in comparison with the characteristics shown in FIG. 12B. It is noted that in the present embodiment, the angle of the mirror relative to the etalon is preferably 1° or less. If this angle is exceeded, the shift amounts of the peak positions of dispersion characteristics curves obtained by each of the reflections on the etalon with respect to wavelengths will increase to an undesirable level, resulting in undesired characteristics.

In the dispersion compensator according to the present invention, a light beam may be emitted from and enter into the opposite side. More specifically, while a light beam is passed through the collimator 30a, etalon 1a, collimator 31a, collimator 30b, etalon 1b, and collimator 31b in this order in the configuration of FIG. 14A, the same results can also be obtained by reversing the order, that is, the order of the collimator 31b, etalon 1b, collimator 30b, collimator 31a, etalon 1a, and collimator 30a to pass the light beam.

Figure 15:
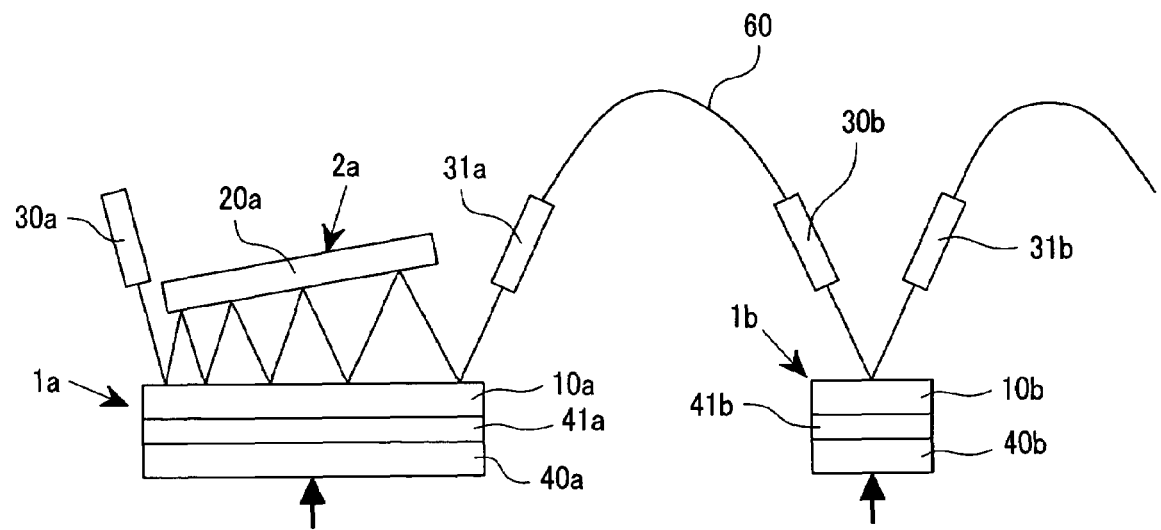
FIG. 15 is a diagram showing a structure that not includes a mirror in a post-compensating section of FIG. 14A.

To correct dispersion characteristics with an etalon of a low amplitude reflectance, the etalon may be adapted so as to reflect a light beam only one time. FIG. 15 shows a configuration for this correction. In this case, no mirror is necessary since the etalon reflects the light beam only one time. In addition, as with the configuration shown in FIG. 14A, while this configuration assumes that a light beam is passed through the collimator 30a, etalon 1a, collimator 31a, collimator 30b, etalon 1b, and collimator 31b in this order, the same results can also be obtained by reversing the order, that is, the order of the collimator 31b, etalon 1b, collimator 30b, collimator 31a, etalon 1a, and collimator 30a to pass the light beam.

Figure 16:
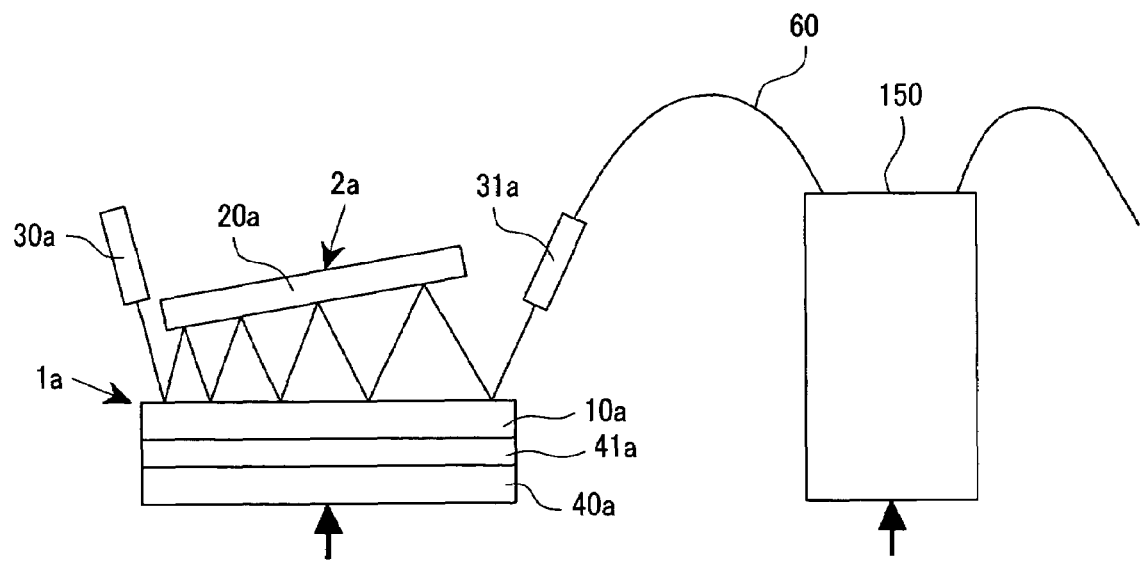
FIG. 16 is a diagram explaining that the post-compensating section of FIG. 14A can take various configurations.

Furthermore, with this concept developed, dispersion compensation for conducting corrections for a higher-order dispersion ripple may use an element other than an etalon. FIG. 16 shows the configuration of above dispersion compensation. In this figure, a variable dispersion compensating unit 150 conducts corrections for the higher-order dispersion ripple. The variable dispersion compensating unit 150 may be an element that achieves a relatively small amount of dispersion. For example, a conventional optical fiber grating, a multi-cavity etalon, or a ring cavity may be used as the element.

Figure 17A:
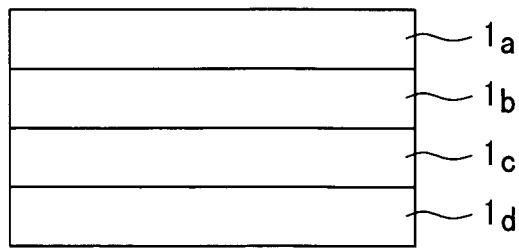
FIGS. 17A through 17C are diagrams that show structural examples of a multi-cavity etalon and temperature control.
Figure 17B:
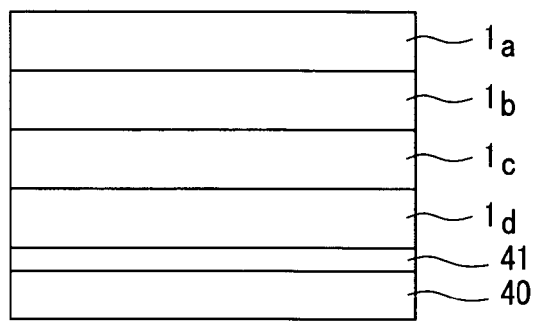
Figure 17C:
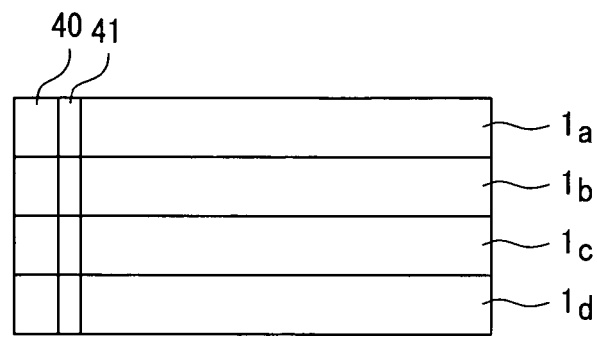

The multi-cavity etalon here refers to an etalon having such a multiple-resonance structure as shown in FIG. 17A. In FIG. 17A, etalons 1a through 1d are formed into a four-layer laminated structure. That is, in this structure, multiple etalons are laminated on one another, each with the planar plate 10 (that has been described with reference to FIG. 2) and each with reflection films on both sides of the planar plate 10. The multi-cavity etalon structure, compared with a single-cavity etalon structure, can be increased in design flexibility by changing the reflectances of reflection films of each etalon. Desired dispersion characteristics can therefore be easily achieved. In consideration of reduction in the number of components, as shown in FIG. 17B, it is preferable for temperature control of the multi-cavity etalon to provide a structure with one set of a heat transfer material 41 and a temperature control element 40 laminated on the lower reflection film of the lowest-layer etalon 1d. As shown in FIG. 17C, however, a preferable structure is such that an "n" number of sets of the heat transfer materials 41 and the temperature control elements 40 are laminated at ends of planar plates 10 of etalons 1a to 1d for an "n" number of multi-cavity etalon layers, from the view point of fine temperature control. In FIG. 17C, each temperature control element is in contact only with one end of each planar plate. Further preferably, however, each temperature control element should be in contact so as to surround the entire planar plate.

Figure 18A:
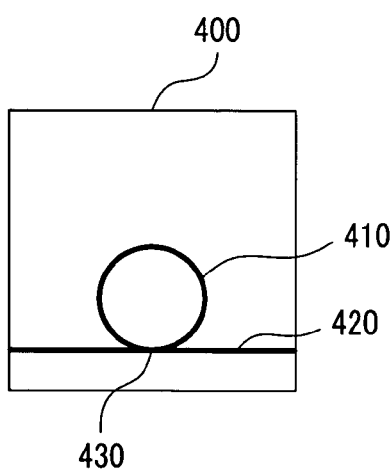
FIGS. 18A and 18B are diagrams showing examples of configurations of ring resonators.
Figure 18B:
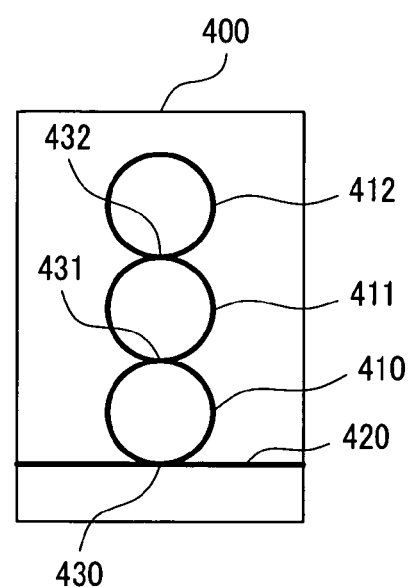

Alternatively, a ring cavity may be used instead of the multi-cavity etalon. Since an expression for representing delay characteristics of the ring cavity is the same as that for representing delay characteristics of the etalon, the concept according to the present invention can be applied to the ring cavity. FIGS. 18A and 18B show a ring-cavity structure. The ring cavity shown in FIG. 18A includes an optical substrate 400, a ring resonating element 410, an optical waveguide 420, and an optical coupler 430. The optical waveguide is higher than the substrate in terms of a refractive index of light. A light beam is confined inside the waveguide and does not leak to the substrate. In the figure, a light emitted from the left of the waveguide travels to the right side in the waveguide and reaches the optical coupler 430, at which the light beam is then divided into light that directly travels straight along the optical waveguide 420 and light that travels toward the ring resonating element 410. After the light beam has circled the ring resonating element 410, a portion of the light beam reaches the optical waveguide 420 and travels straight along the optical coupler 430 and the other portion circles the ring resonating element 410 once again. In this way, after circling the ring resonating element 410 several times, the portions of the light beam are coupled together and then go out into the waveguide 420, thereby to realize a resonator. It is also possible to form multiple stages of the ring resonating element 410 and the optical coupler 430, as shown in FIG. 18B. More specifically, ring resonating elements 411 and 412 are stacked on the ring resonating element 410, and their coupling portions are used as optical couplers 431 and 432. Thus, this structure increases design flexibility in comparison with that of a single-stage structure, making it possible to easily realize desired dispersion characteristics.

Further alternatively, it is also possible to use, in lieu of the multi-cavity etalon, a photonic crystal or photonic crystal fiber that has been actively researched in recent years in anticipation of application to dispersion compensating elements. The photonic crystal is a structure in which substances of different refractive indices are regularly and periodically arrayed with sizes smaller than any wavelength of light. Since light of a specific wavelength region is not transmitted depending on the photonic crystal period, the crystal can confine the light therein. Thus, it is expected that the photonic crystal or the like will be applicable to the elements that give desired dispersion characteristics. The photonic crystal fiber is an optical fiber with a cladding having a structure in which a large number of air holes are regularly arrayed. It is known that this fiber is capable of providing great wavelength dispersion, compared with a normal fiber. In order for the variable dispersion compensator to reduce the higher-order dispersion (shown in expression (6)) to zero, dispersion slopes "$a_1$" and "$a_2$" shown in FIG. 8(A) must be opposite in sign to each other and the same in absolute value.

$$D_2 = \frac{dD}{d\lambda} \tag{6}$$

Figure 1:
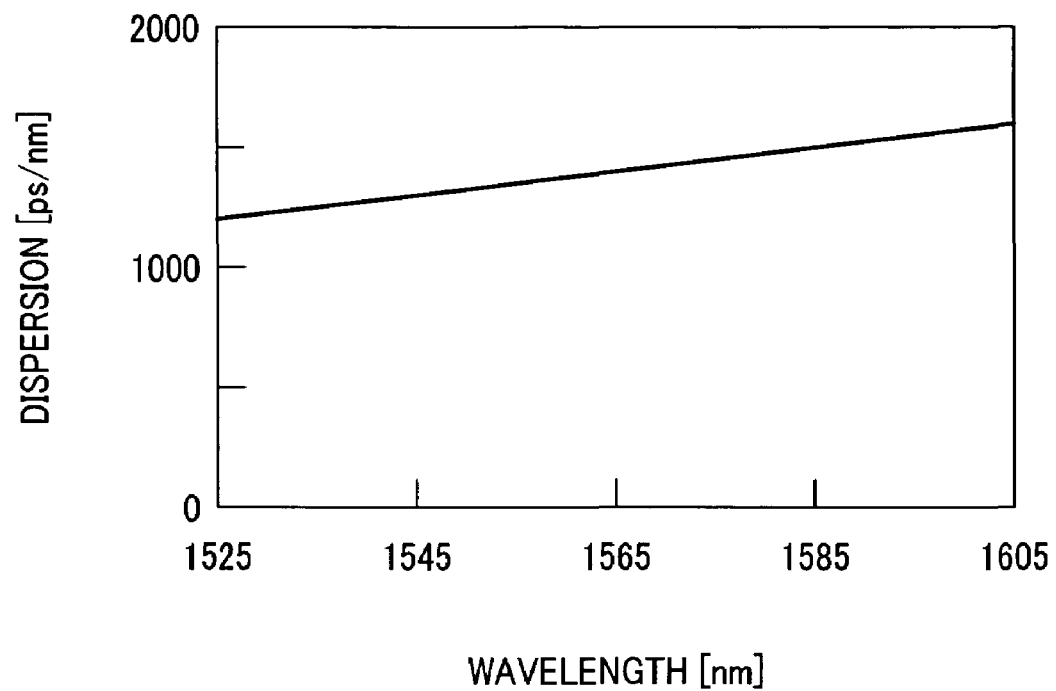
FIG. 1 is a graph showing dispersion characteristics of a single mode fiber.

Ideally, it is preferable that both dispersion slopes be the same in absolute value. In consideration of manufacturing related problems, differences in system specifications or the like, however, it is accepted that a differential relative quantity of $|(a_1-a_2)/a_1|$ is about 0.1 or less in some cases. As shown in FIG. 1, however, an actual optical fiber provides values with a dispersion slope (high-order dispersion expressed by expression (6)), and the amount of dispersion varies depending on the wavelength. A description will now be made of a method for realizing a dispersion compensator that supports such a dispersion slope and collectively compensates dispersion of an optical signal wavelength-multiplexed in a WDM transmission system.

Figure 19:
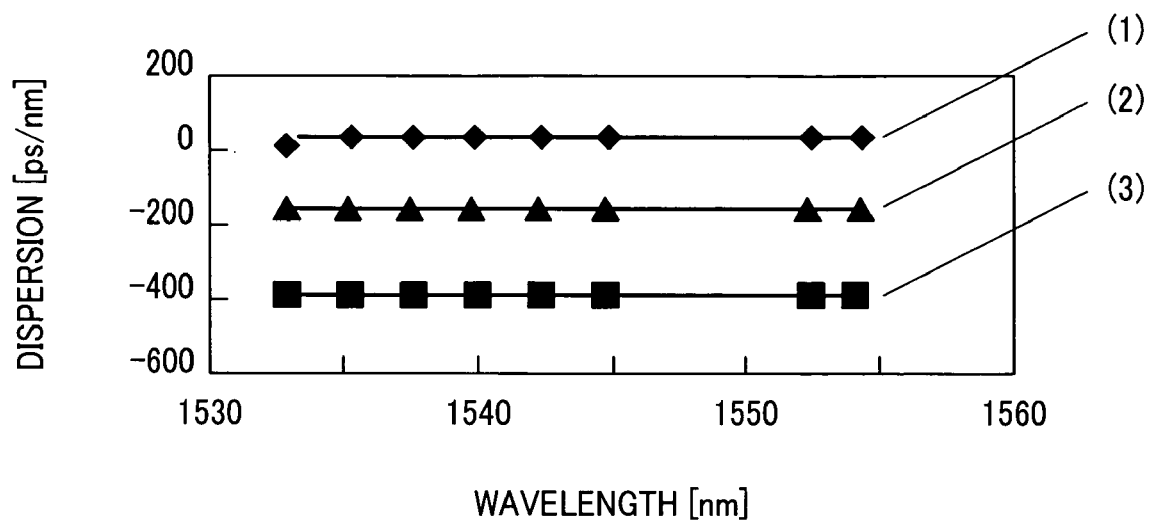
FIG. 19 is a graph showing characteristics of a variable dispersion compensator according to the present invention.
Figure 20:
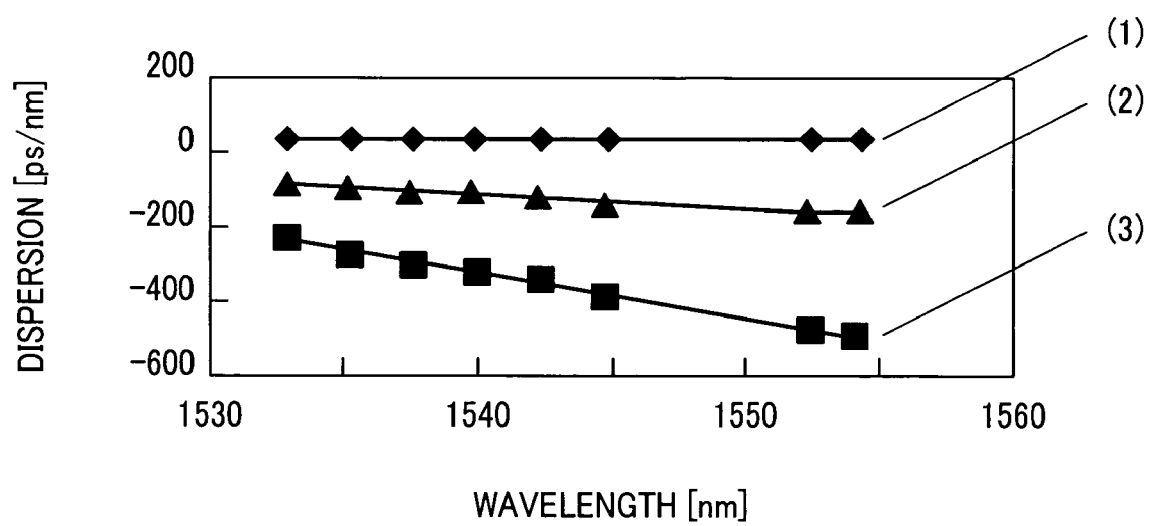
FIG. 20 is a graph showing characteristics of a variable dispersion slope compensator according to the present invention.

FIGS. 19 and 20 are graphs showing examples of characteristics of the variable dispersion compensator and those of the variable dispersion slope compensator. FIG. 19 shows the case where the amounts of dispersion decrease from (1) to (3) equally in each wavelength (in parallel in the figure). FIG. 20, on the other hand, shows the case where the amounts of dispersion decrease from (1) to (3) significantly with increasing the wavelength (downward sloping line from left to right in the figure). With such characteristics, it becomes possible to perform dispersion compensation with supporting dispersion slopes of a fiber.

Figure 21:
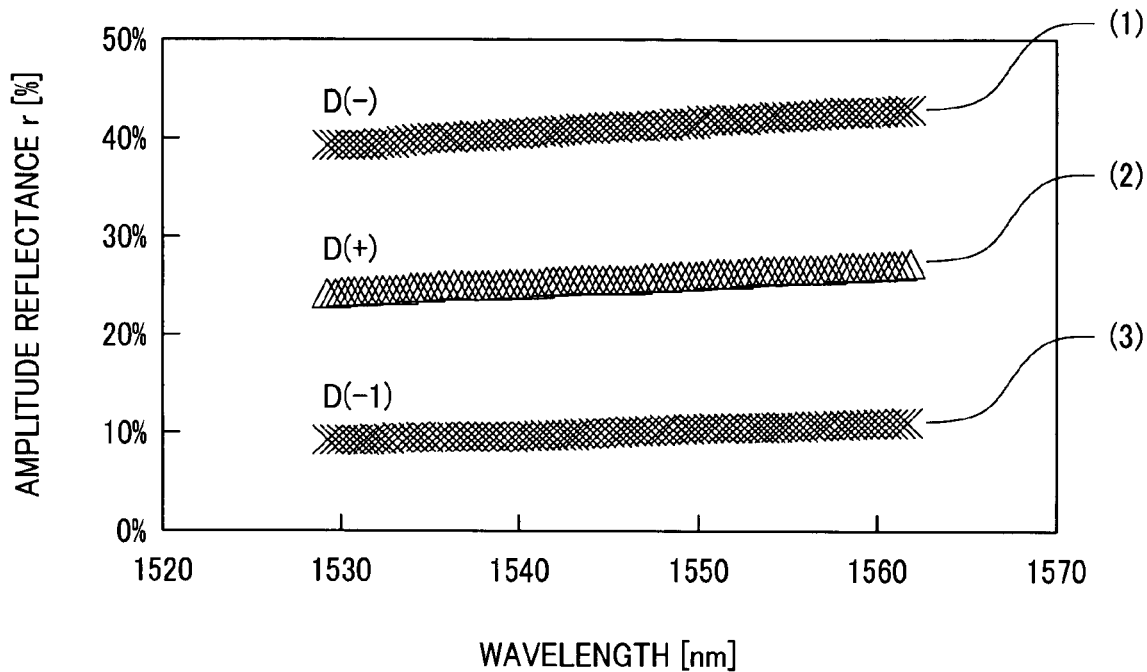
FIG. 21 is a graph showing the reflectance dependence of a filter provided for the optical resonator to realize the variable dispersion slope compensator.
Figure 22:
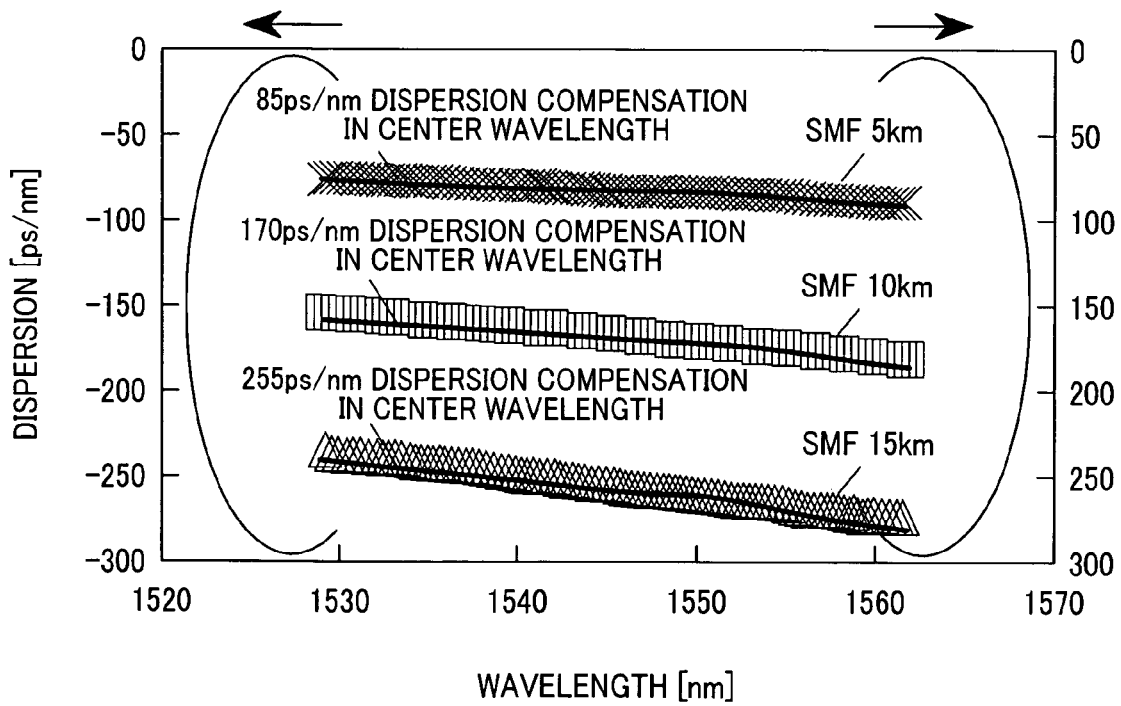
FIG. 22 is a graph showing characteristics of a single mode fiber and those of the variable dispersion slope compensator.

To realize those characteristics, a consideration will be given of the case where an optical resonator has a filter of the etalon 1 with a reflection film 11 which has wavelength dependence as shown in FIG. 2. In such an optical resonator, the etalon 1 has loss characteristics in which the optical loss is constant, as an all pass filter, like a GT etalon. In addition, the etalon 1 has dispersion characteristics in which the reflectance is varied for each wavelength, which are equivalent to characteristics of a GT etalon. As shown in FIG. 21, three types of amplitude reflectances D(−), D(+) and D(−1) with respect to wavelengths are given. In this case, the etalon 10 shown in FIG. 10 is used with the amplitude reflectance D(+), the etalon 10a shown in FIG. 14 is used with the amplitude reflectance D(−), and the etalon 10b shown in FIG. 14 is used with the amplitude reflectance D(−1). If a light beam is reflected seven times for the amplitude reflectance D(+), five times for the amplitude reflectance D(−), and five times for the amplitude reflectance D(−1), it is possible to obtain characteristics of a variable dispersion slope compensator as shown in FIG. 22. FIG. 22 shows dispersion characteristics of a 5 km SMF, those of a 10 km SMF, and those of a 15 km SMF in the order from the top. The characteristics of the variable dispersion slope compensator according to the present invention are shown with solid lines in FIG. 22. The three solid lines shown in FIG. 22 indicate characteristics in the cases where the dispersion values in the center wavelength in the wavelength band are 85 ps/nm, 170 ps/nm, and 255 ps/nm, in the order from the top. This indicates that the reflectance with wavelength dependence makes it possible to realize a variable dispersion slope compensator.

Figure 23:
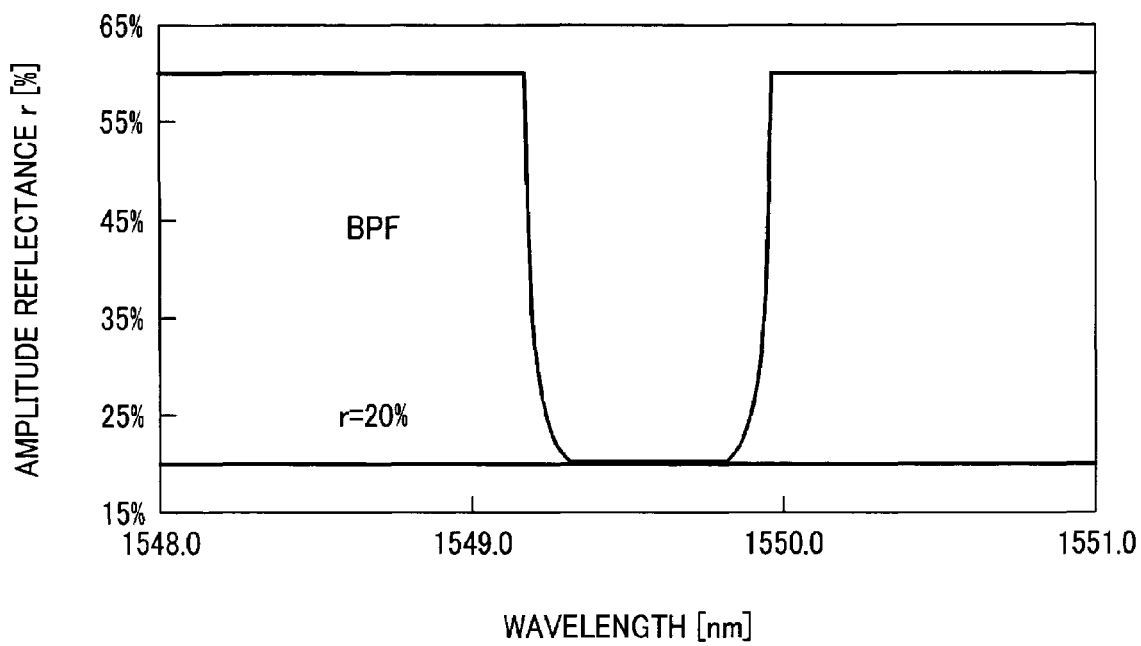
FIG. 23 is a graph showing the reflectance dependence of the filter provided for the optical resonator to increase the wavelength band.
Figure 24:
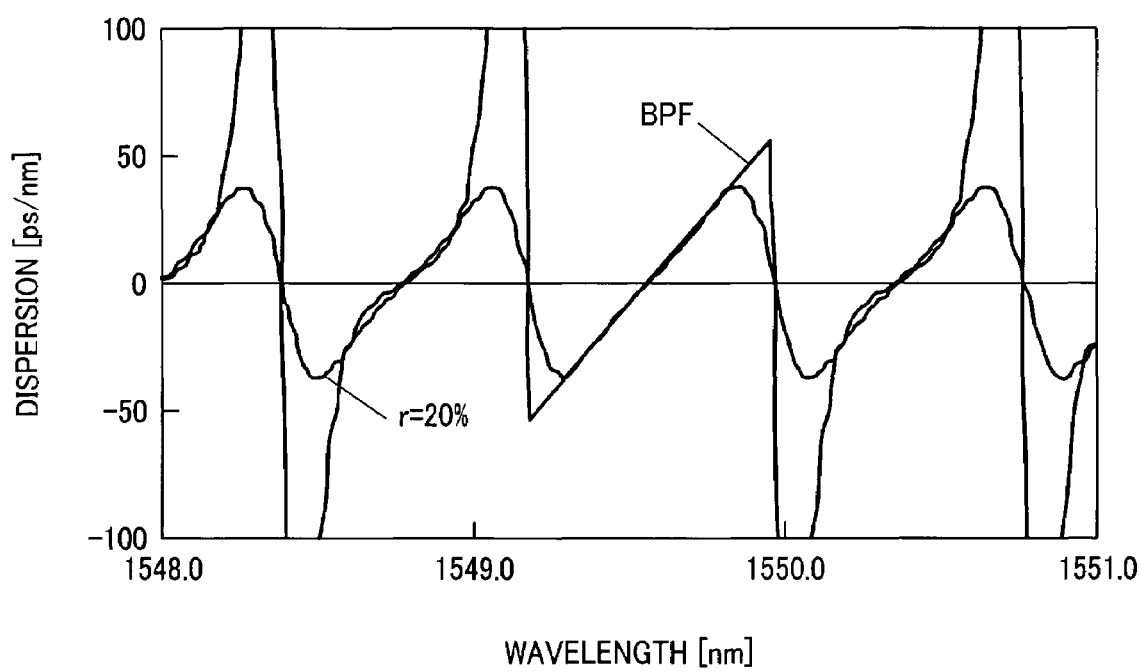
FIG. 24 is a graph showing dispersion characteristics of a plus-side variable dispersion compensating unit in the case of using an optical resonator with a filter having wavelength dependence of reflectance.
Figure 25:
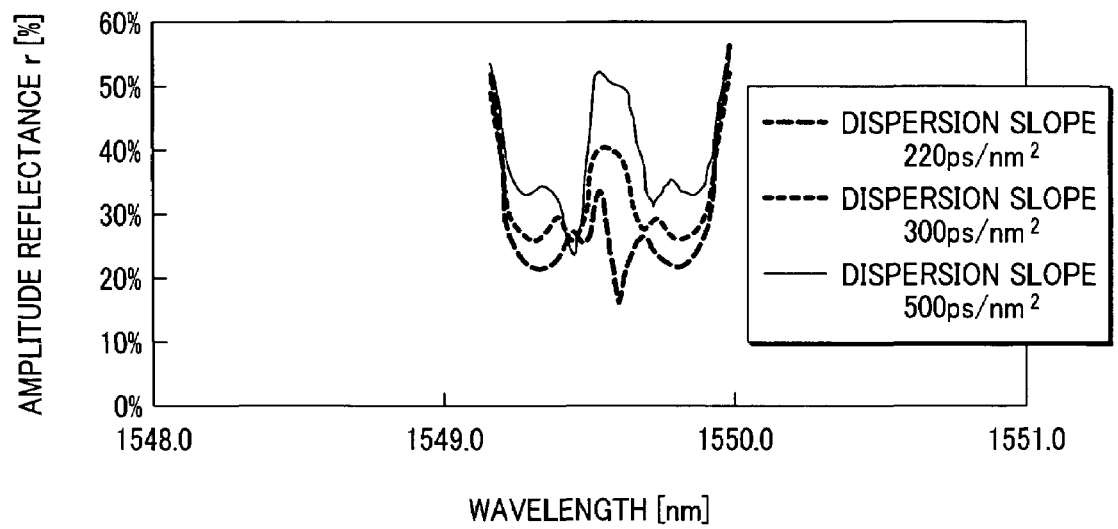
FIG. 25 is a graph showing the reflectance dependence of a filter provided on an optical resonator to increase a positive dispersion slope.

In addition, a description will be made of a method of increasing an effective wavelength band and a method of increasing amounts of dispersion, with a reflection film having wavelength dependence. Here, a consideration will be given of a filter that shows reflectance characteristics with respect to wavelengths as shown in FIG. 23 (indicated with BPF in the figure). For comparison, a constant amplitude reflectance (r=20%) with respect to wavelengths is shown in FIG. 23. FIG. 24 shows dispersion characteristics in this case. In the case where the amplitude reflectance is 20%, dispersion characteristics curve is a shape like a triangular wave, which is slightly obtuse. If the filter has reflection characteristics indicated with BPF in FIG. 23, however, it is apparent that the dispersion characteristics become linear and the portion of the positive dispersion slope increases with respect to the wavelengths. Also, it is clear that the wavelength band is increased. FIG. 25 shows wavelength dependence of the amplitude reflectance to realize positive dispersion slopes 220 ps/nm², 300 ps/nm², and 500 ps/nm². A filter having such reflectance characteristics provided on one side of an etalon increases a positive dispersion slope of dispersion characteristics of a compensator, resulting in an increase of amounts of dispersion of a variable dispersion compensator.

Figure 29:
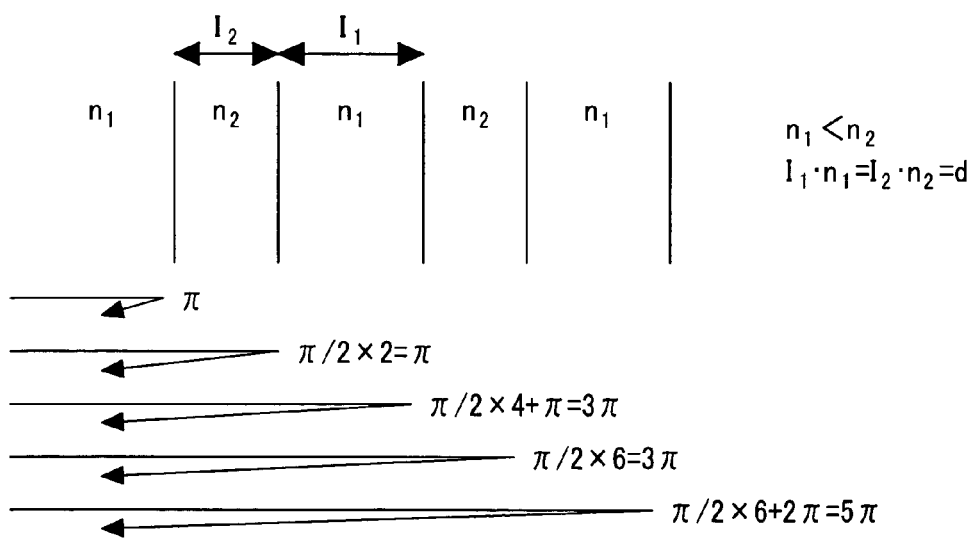
FIG. 29 is a diagram showing a dielectric multi-layer film used for the optical resonator of the present invention.

Next, a description will be made of a method of manufacturing a reflection film whose reflectance has wavelength dependence as shown in FIGS. 21 and 23. Such a reflection film can be realized by having a dielectric multi-layer film structure in which at least two dielectric thin films each with a different refractive index are overlapped. In the dielectric multi-layer film structure, a light beam is reflected and refracted at boundary surfaces between layers. As a result of the total of interferences after repeating reflections and refractions, the transmission/reflection characteristics of the entire multi-layer film structure are determined. For example, with respect to a structure in which dielectric films each with a high refractive index and an optical film thickness of d (d=n×l, where, n is a refractive index, and l is a physical film thickness) and dielectric films each with a low refractive index and the optical film thickness d are alternately laminated, it is well known that the structure can be used as a reflection film for light with a wavelength λ and with the relationship "λ/4=d" satisfied. FIG. 29 shows phase relationships of reflection waves in the above case. For the model shown in FIG. 29, a consideration will be given of a structure in which two types of films, one with a refractive index $n_1$ and the optical film thickness d and the other one with a refractive index $n_2$ and the optical film thickness d, are alternately laminated with the relationship "λ/4=d" satisfied.

When light with the wavelength λ travels a distance of the optical film thickness d, the phase is shifted by π/2. When the light is reflected on a film boundary surface having a high refractive index (the light enters from $n_1$ side into $n_2$ side), the phase of the reflection wave is shifted by π. In consideration of the above fact, the phase differences of the light reflected from each boundary surface are all integral multiples of 2π. As a result, the phases of the reflection waves from each boundary surface are all the same, resulting in a strong reflection. A consideration will now be given of the case where light with a wavelength different from the wavelength λ is incident on the same multi-layer film. Since light with the different wavelength varies the shift amount of the phase obtained when the light travels in the film with an optical film thickness d, the phases of the reflection waves reflected from each boundary surface are not consistent. In this case, therefore, the strength of the reflection waves is lowered compared with the case where the relationship "λ/4=d" is satisfied. As can be understood from the above description, reflection characteristics of light incident on a multi-layer film is dependent on phase relationships of light reflected from each boundary surface, and the phase shifts depend on the wavelengths. As a result, the reflection characteristics are dependent on the wavelengths.

In the case where a reflective index is relatively slightly dependent on wavelengths as shown in FIG. 21, varying thicknesses of individual layers included in a film having a relatively small number of layers adjusts the wavelength dependence obtained from the phase relationships of the reflection waves, making it possible to design a multi-layer film having desired characteristics. In fact, the reflectance of FIG. 21 is designed with the assumption of a multi-layer film having the following parameters. A film(s) with a high reflectance uses $Ta_2O_5$, and a film(s) with a low reflectance uses $SiO_2$. A filter having such reflection characteristics can be realized using a multi-layer film including two to three layers.

Detailed film structures are described below. In the case of D(−), a film having such reflection characteristics can be realized with a two-layer structure having a layer of 1.79079H and a layer of 1.97362L for a wavelength λ of 1550 nm, where H is a film formed of a high refractive index medium and with an optical film thickness λ/4, L is a film formed of a low refractive index medium and with an optical film thickness λ/4, and the coefficients in front of H and L each indicate a film thickness of a multiple number of λ/4. Next, in the case of D(−1), such a film can be realized with a three-layer structure having 4.16337H, 2.45068L, and 2.76401L layers. In the case of D(+), such a film can be realized with a two-layer structure having 0.3416H and 1.15179L layers.

Figure 30:
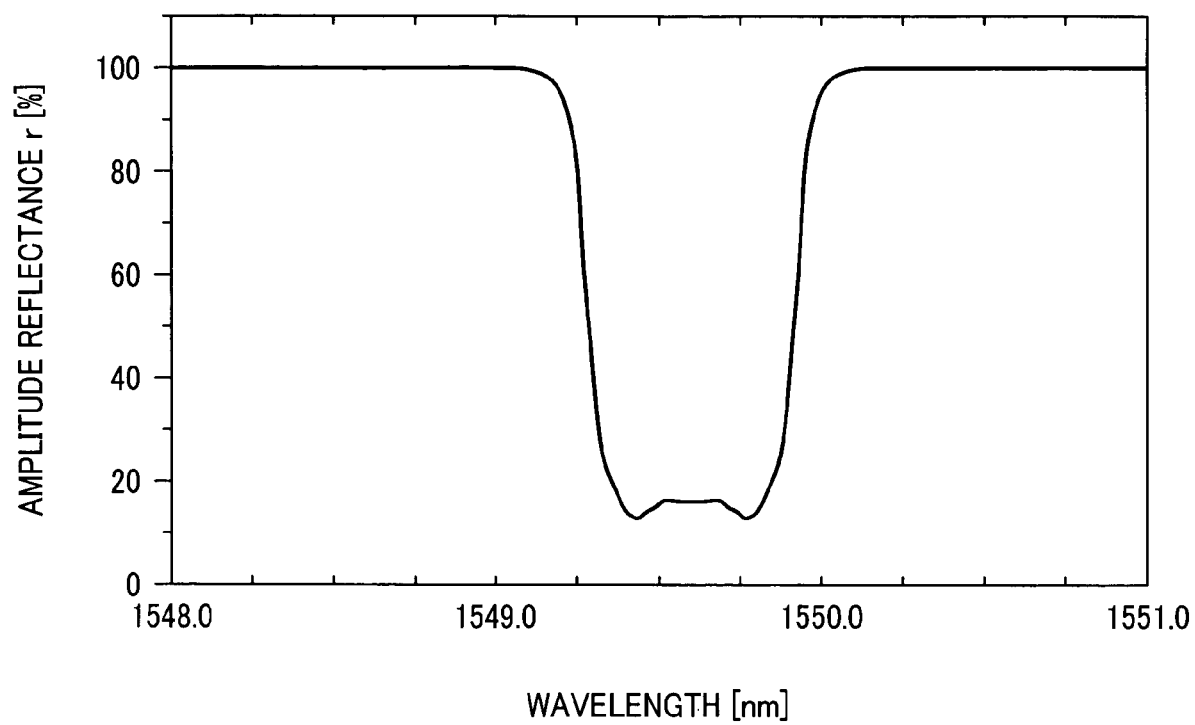
FIG. 30 is a graph showing reflectance dependence of the dielectric multi-layer film in terms of a wavelength.

A film having characteristics in which the reflectance is significantly varied in specific wavelengths as shown in FIG. 23 is designed with a design method for BPF (Band Pass Filter). A typical BPF can be realized by having a structure in which films of H medium and films of L medium are alternately laminated, both the types of films satisfying the relationship "λ/4=d", and resonator layers each with a thickness different from the films are inserted between laminated layers each including the films. FIG. 30 shows a graph showing an example of a design to realize the characteristics shown in FIG. 23. A thin film having the characteristics shown in FIG. 23 has a structure of 1H, $(1L\ 1H)^6$, 12L, 1H, $(1L\ 1H)^{13}$, 14L, 1H, $(1L\ 1H)^{14}$, 14L, 1H, $(1L\ 1H)^{14}$, 14L, 1H, $(1L\ 1H)^{13}$, 12L, $(1L\ 1H)^7$, 1.88587H, and 0.245L. The subscripts for each parenthesis indicate the number of repetitions (e.g., $(1L\ 1H)^3$ means a structure of 1L, 1H, 1L, 1H, 1L and 1H). This structure has five resonator layers of 12L and 14L that are sandwiched between layers of thirteen- or fourteen-laminated film pair (1L 1H) The two layers closest to the surface and having non-integral coefficients are implemented for control of absolute values of the reflectances to reduce ripples.

Specifically, an ion assisted deposition method is used to form the thin film. In this method, during a normal process in which a material is heated and sublimed to adhere to a substrate, ion beams emitted from an ion gun impart kinetic energy to the direction of the substrate to the material to form the film. Using this method, a film with a high density and a low optical loss can be obtained. In addition, a constant film formation speed can be maintained. Alternatively, an ion beam sputtering method and the like are known as a film formation method of forming a dielectric thin film with a high quality. It is needless to say that the variable dispersion compensator according to the present invention may be obtained with use of these methods. During the formation of the film, light is emitted on the substrate and the film thickness is controlled with in-situ monitoring of the reflectance of the film. Thus, it is possible to finely control a film thickness, as described above. In this example, $SiO_2$ is used for a material with a low refractive index, and $Ta_2O_5$ is used for a material with a high refractive index. The similar performance can be obtained by using a dielectric thin film of $TiO_2$, $Nb_2O_5$, $MgF_2$, MgO, $Al_2O_3$, $HfO_2$, $ZrO_2$, or the like since it is known that a film with a high quality can be formed by using these materials with vapor deposition or sputtering.

Figure 26:
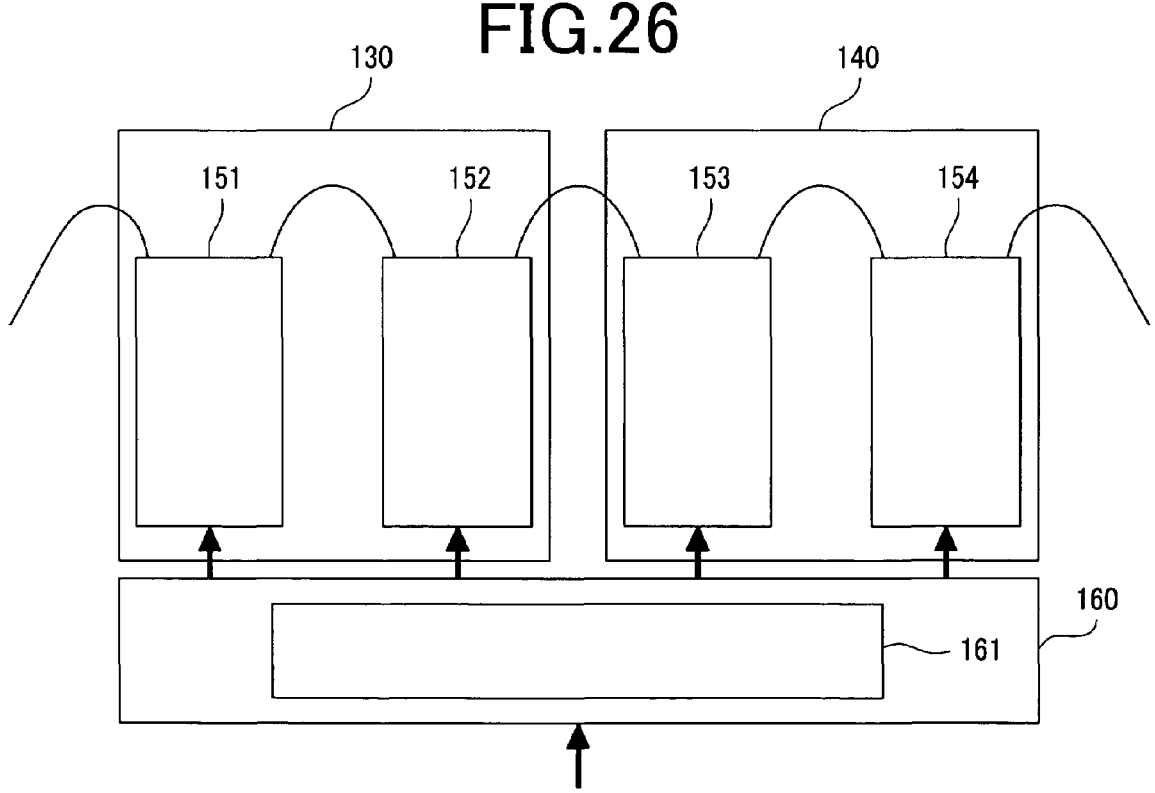
FIG. 26 is a diagram showing a first configuration of the variable dispersion compensator having a conversion table including evaluation results concerning the relationships between the amounts of dispersion and optimal temperatures of each compensating unit.

Next, a variable method with temperature control will be described. The control of temperatures of actual etalons, however, may not be ideally performed for some reasons such as differences in material properties among the etalons for manufacturing. For this case, relationships between amounts of dispersion and optimal temperatures for each compensating section are evaluated in advance, and a conversion table is provided to include the evaluation. In the configuration shown in FIG. 26, a converting unit 160 having a conversion table 161 controls compensating sections 151, 152, 153, and 154, of the plus-side variable dispersion compensating unit 130 and the minus-side variable dispersion compensating unit 140 to a temperature appropriate for the amount of dispersion that has been set by the user. In this example, the plus-side variable dispersion compensating unit 130 and the minus-side variable dispersion compensating unit 140 each include one pre-compensating section and one post-compensating section. One or more pre-compensating sections and post-compensating sections, however, may be added.

Figure 27:
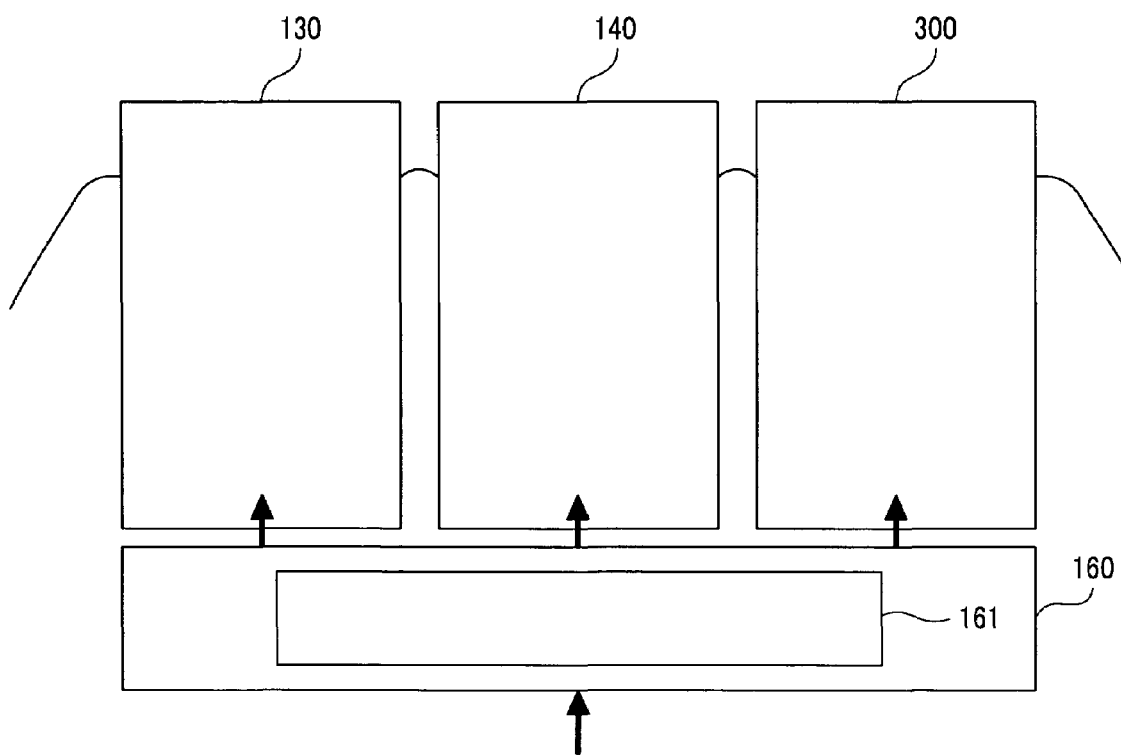
FIG. 27 is a diagram showing a second configuration of the variable dispersion compensator having a conversion table including evaluation results concerning the relationships between the amounts of dispersion and optimal temperatures of each compensating unit.
Figure 28:
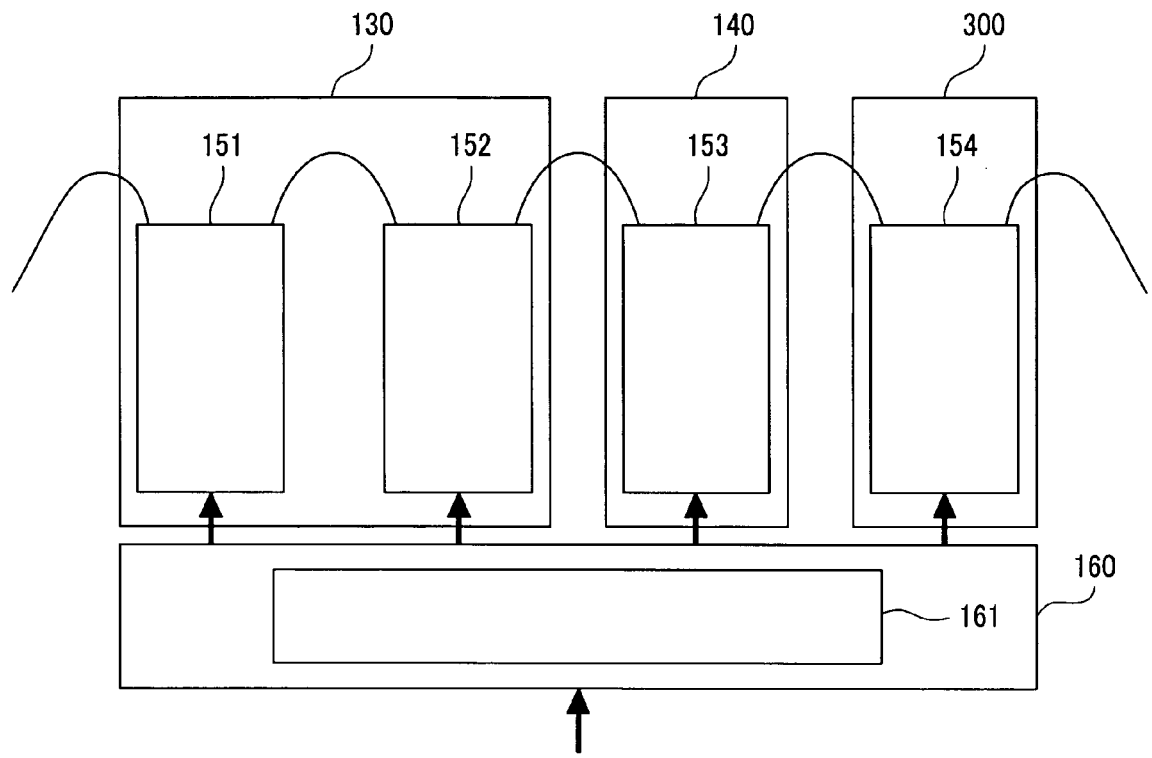
FIG. 28 is a diagram showing a third configuration of the variable dispersion compensator having a conversion table including evaluation results concerning the relationships between the amounts of dispersion and optimal temperatures of each compensating unit.

Additionally, the dispersion characteristics of the plus-side variable dispersion compensating unit 130 and those of the minus-side variable dispersion compensating unit 140 may not be ideal for some reasons such as differences in material properties among the etalons for manufacturing. For this case, a variable dispersion compensating unit 300 for correction is provided to correct the characteristics of both the plus-side and minus-side variable dispersion compensating units, as shown in FIG. 27. In this configuration with the three compensating units, a converting unit 160 is provided to show relationships between the amounts of dispersion and optimal temperatures of each compensating unit, making it possible to independently control the compensating units. More specifically, the post-compensating section of the minus-side dispersion compensating unit 140 shown in FIG. 14A may be used as the variable dispersion compensating unit 300 for correction. In this case, the pre-compensating section of the minus-side dispersion compensating unit 140 shown in FIG. 14A is used as the minus-side variable dispersion compensating unit 140 shown in FIG. 27, and is controlled independently of the variable dispersion compensating unit 300 for correction. FIG. 28 shows a configuration with a plus-side variable dispersion compensating unit 130, a minus-side variable dispersion compensating unit 140 and a variable dispersion compensating unit 300. In this configuration, the plus-side variable dispersion compensating unit 130 has a two-stage arrangement with variable dispersion compensating sections 151 and 152, the minus-side variable dispersion compensating unit 140 has a single-stage arrangement with a variable dispersion compensating section 153, and the variable dispersion compensating unit 300 for correction has a single-stage arrangement with a variable dispersion compensating section 154. One side of each of etalons in the variable dispersion compensating sections 151 and 152 may have the same or different amplitude reflectance from each other. Also, when the variable dispersion compensating sections 151 and 152 are structured each with an etalon and a mirror opposed to the etalon, both the sections 151 and 152 may also be adapted to reflect, on each etalon, a light beam the same or different number of times from each other. For these values, it is only necessary to design the compensating sections so as to obtain the negative dispersion slope of dispersion characteristics of the minus-side variable dispersion compensating unit 140.

In other words, if ideal dispersion characteristics cannot be obtained for manufacturing related reasons, it is only necessary that three or four types of etalons each with a different amplitude reflectance be used in the variable dispersion compensating sections 151 to 154 shown in FIG. 28 to form a four-stage arrangement, and that the converting unit 160 provided with a conversion table 161 be used to perform temperature control independently for three or four systems. In a more simplified configuration, three types of etalons each with a different amplitude reflectance may be used in the variable dispersion compensating sections 151 to 154 to form a four-stage arrangement (151 and 152 have etalons with the same reflectance). Thus, temperature control may be performed independently for each of three systems for the plus-side variable dispersion compensating unit 130, the minus-side variable dispersion compensating unit 140, and the variable dispersion compensating unit 300 for correction. If the configuration is simplified to this extent, however, the amount of dispersion is not be large or has a positive-negative asymmetrical pattern since the dispersion characteristics of the plus-side variable dispersion compensating unit 130 may not always represent a polygonal line. It is possible, however, to manufacture variable dispersion compensators with a low cost by reducing the number of components required and/or simplifying the temperature control sections.

As described above, the present invention makes it possible to obtain a variable dispersion slope compensator with a simple configuration. In addition, the invention enables to obtain a practical variable dispersion compensator capable of performing a large amount of variable dispersion compensation in a wide effective wavelength band, which is suitable for a wavelength division multiplexing optical transmission system.

Next, a description will now be made of other technical ideas with their effects than the appended claims. The technical ideas other than the appended claims can be understood from the abovementioned embodiment of the present invention.

1) A variable dispersion compensator comprising a variable dispersion compensating unit that includes: an optical resonator receiving a light beam emitted from a collimator and with a predetermined amplitude reflectance; and a mirror disposed to be opposed to the optical resonator and with an angle of 0 degree or more relative to the optical resonator, wherein: the variable dispersion compensating unit reflects a light beam $n_1$ times ($n_1$ is a counting number); the optical resonator has a first and second plane surfaces each opposed to each other, the reflectance of the first plane surface being equal to or more than 90% and equal to or less than 100%, the reflectance of the second plane surface being lower than that of the first plane surface; and the second plane surface is formed of a filter whose reflectance has wavelength dependence in a predetermined effective wavelength band.

2) The variable dispersion compensator abovementioned in 1) with the filter formed of a dielectric multi-layer film that has a structure in which a first dielectric and a second dielectric are alternately laminated, the first dielectric having a first refractive index and a predetermined thickness, and the second dielectric having a second refractive index lower than the first refractive index and the predetermined thickness.

As shown in the above example, optical reflection characteristics of the multi-layer film are dependent on phase relationships obtained from each boundary surface. The phase shift depends on the wavelength. Thus, the dielectric multi-layer film makes it possible obtain a film whose reflection characteristics include wavelength dependence.

3) The variable dispersion compensator abovementioned in 2) with the first dielectric material made of any one of materials of $Ta_2O_5$, $TiO_2$, $Nb_2O_5$, $MgF_2$, $MgO$, $Al_2O_3$, $HfO_2$, and $ZrO_2$, and the second dielectric material made of $SiO_2$.

4) The variable dispersion compensator abovementioned in 1) having a plurality of the variable dispersion compensating units that are cascade-connected.

5) The variable dispersion compensator abovementioned in 1) having the optical resonator with temperature control means.

As shown in FIG. 8A, when the overlapping range of the linear part with the positive dispersion slope and the linear part with the negative dispersion slope is large, the flat part on the upper side is wide and low. As shown in FIG. 8C, on the other hand, when the overlapping range is small, the flat part on the upper side is narrow and high. As described above, controlling temperatures of the plus-side variable dispersion compensating unit and minus-side variable dispersion compensating unit makes it possible to change the amounts of dispersion.

6) The variable dispersion compensator abovementioned in 5) with the temperature control means whose temperature control range is 5° C. or more.

7) The variable dispersion compensator abovementioned in 1) with the optical resonator using a multi-cavity etalon.

For dispersion compensation (post-dispersion compensating section) to correct high-order dispersion ripple, an element other than an etalon may be used. FIG. 16 shows its configuration. In this figure, a variable dispersion compensating unit 150 corrects high-order dispersion ripple. The variable dispersion compensating unit 150 may be an element that obtains a relatively small amount of dispersion, such as a conventional optical fiber grating, multi-cavity etalon, or ring cavity.

What is claimed is:

1. A variable dispersion compensator comprising:
   a first variable dispersion compensating unit that includes a first optical resonator receiving a light beam emitted from a collimator and a first mirror disposed with a predetermined angle relative to the first optical resonator, and that reflects the light beam $n_1$ times ($n_1$ is a counting number);
   a second variable dispersion compensating unit that includes a second optical resonator receiving the light beam emitted from a collimator and a second mirror disposed with a predetermined angle relative to the second optical resonator, and that reflects the light beam $n_2$ times ($n_2$ is a counting number); and
   a third variable dispersion compensating unit that includes a third optical resonator receiving the light beam emitted from a collimator;
   wherein:
   the first and second optical resonators each have a first and second plane surfaces that are opposed to each other, the first plane surface having a reflectance of 90% or more and 100% or less, and the second plane surface having a reflectance lower than the reflectance of the first plane surface;

when the shortest wavelength within a wavelength band of a multiplexed optical signal incident on the second plane surface is a first wavelength, and the longest wavelength within the wavelength band is a second wavelength, a reflectance of light with the first wavelength and a reflectance of light with the second wavelength are different from each other on the second plane surface;

a filter is disposed on the second plane surface, the filter being designed such that the value of a reflectance is monotonously increased or monotonously decreased between the first and second wavelengths; and the first variable dispersion compensating unit, the second variable dispersion compensating unit and the third variable dispersion compensating unit are cascade-connected.

2. The variable dispersion compensator according to claim 1, wherein:

the first, second and third optical resonators each have temperature control means that is independent from the other temperature control means; and each of the temperature control means has a converting unit that sets the temperature of the corresponding optical resonator to a desired temperature based on a set amount of dispersion.

3. The variable dispersion compensator according to claim 1, wherein the first optical resonator and the first mirror are disposed in parallel with each other.

4. The variable dispersion compensator according to claim 1, wherein the third variable dispersion compensating unit has a third mirror that is disposed to be opposed to and with a predetermined angle of 0° or more relative to the third optical resonator, and reflects the light beam $n_3$ times ($n_3$ is a counting number).

5. The variable dispersion compensator according to claim 1, wherein the filter is formed of a dielectric multi-layer film with a structure in which a first dielectric film and a second dielectric film are alternately laminated, the first dielectric film having a first refractive index and a predetermined thickness, and the second dielectric film having a second refractive index lower than the first refractive index and the predetermined thickness.

6. The variable dispersion compensator according to claim 5, wherein the first dielectric is made of any one of $Ta_2O_5$, $TiO_2$, $Nb_2O_5$, $MgF_2$, $MgO$, $Al_2O_3$, $HfO_2$, and $ZrO_2$, and the second dielectric is made of $SiO_2$.

7. The variable dispersion compensator according to claim 1, wherein the light beam enters an output side of each of the first, second, and third optical resonators.

8. The variable dispersion compensator according to claim 1, wherein at least one of the optical resonators of the first, second, and third variable dispersion compensating units uses a multi-cavity etalon.

9. The variable dispersion compensator according to claim 1, wherein at least one of the optical resonators of the first, second, and third variable dispersion compensating units uses a ring cavity.

10. The variable dispersion compensator according to claim 1, wherein the angle of the second mirror relative to the second optical resonator is equal to or less than 1°.

11. The variable dispersion compensator according to claim 1, wherein the first, second and third optical resonators each have temperature control means that is independent from the other temperature control means, and the temperature control range of each of the temperature control means is 5° or more.

12. The variable dispersion compensator according to claim 1, wherein the first, second, and third optical resonators each have a substrate made of a material whose thermal expansion coefficient is equal to or less than $1\times10^{-4}$ and equal to or more than $1\times10^{-6}$.

13. A variable dispersion compensator comprising:

at least four variable dispersion compensating units that each include an optical resonator receiving a light beam emitted from a collimator and a mirror disposed with an predetermined angle relative to the optical resonator and that each reflect the light beam n times (n is a counting number), wherein:

the optical resonators included in each of the at least four variable dispersion compensating units each have a first and second plane surfaces that are opposed to each other, the first plane surface having a reflectance of 90% or more and 100% or less, the second plane surface having a reflectance lower than the reflectance of the first plane surface;

when the shortest wavelength within a wavelength band of a multiplexed optical signal incident on the second plane surface is a first wavelength, and the longest wavelength within the wavelength band is a second wavelength, a reflectance of light with the first wavelength and a reflectance of light with the second wavelength are different from each other on the second plane surface;

a filter is disposed on the second plane surface, the filter being designed such that the value of a reflectance is monotonously increased or monotonously decreased between the first and second wavelengths;

at least two of the variable dispersion compensating units are cascade-connected to form a plus-side variable dispersion compensating unit;

at least two of the variable dispersion compensating units other than the variable dispersion compensating units that form the plus-side variable dispersion compensating unit are cascade-connected to form a minus-side variable dispersion compensating unit; and the plus-side variable dispersion compensating unit and the minus-side variable dispersion compensating unit are cascade-connected.

14. The variable dispersion compensator according to claim 13, wherein the optical resonators each have temperature control means that is independent from the other temperature control means; and each of the temperature control means has a converting unit that sets the temperature of the corresponding optical resonator to a desired temperature based on a set amount of dispersion.

15. The variable dispersion compensator according to claim 13, wherein one of the optical resonators that is the first to receives a light beam is disposed to be opposed in parallel to the corresponding mirror.

16. The variable dispersion compensator according to claim 13, wherein
the filter is formed of a dielectric multi-layer film with a structure in which a first dielectric film and a second dielectric film are alternately laminated, the first dielectric film having a first refractive index and a predetermined thickness, and the second dielectric film having a second refractive index lower than the first refractive index and the predetermined thickness.

17. The variable dispersion compensator according to claim 16, wherein
the first dielectric is made of any one of $Ta_2O_5$, $TiO_2$, $Nb_2O_5$, $MgF_2$, MgO, $Al_2O_3$, $HfO_2$, and $ZrO_2$, and the second dielectric is made of $SiO_2$.

18. The variable dispersion compensator according to claim 13, wherein
at least one of the optical resonators of the variable dispersion compensating units uses a multi-cavity etalon.

19. The variable dispersion compensator according to claim 13, wherein
at least one of the optical resonators of the variable dispersion compensating units uses a ring cavity.

20. The variable dispersion compensator according to claim 13, wherein
each of optical resonators has temperature control means that is independent from the other temperature control means, and the temperature control range of each of the temperature control means is 5° or more.

21. The variable dispersion compensator according to claim 13, wherein
each of the optical resonators has a substrate made of a material whose thermal expansion coefficient is equal to or less than $1\times10^{-4}$ and equal to or more than $1\times10^{-6}$.

22. A variable dispersion compensator comprising:
a first variable dispersion compensating unit that includes a first optical resonator receiving a light beam emitted from a collimator and a first mirror disposed with a predetermined angle relative to the first optical resonator, and that reflects the light beam $n_1$ times ($n_1$ is a counting number);
a second variable dispersion compensating unit that includes a second optical resonator receiving the light beam emitted from a collimator and a second mirror disposed with a predetermined angle relative to the second optical resonator, and that reflects the light beam $n_2$ times ($n_2$ is a counting number); and
a third variable dispersion compensating unit that includes a third optical resonator receiving the light beam emitted from a collimator;
wherein:
the first and second optical resonators each have a first and second plane surfaces that are opposed to each other, the first plane surface having a reflectance of 90% or more and 100% or less, the second plane surface having a reflectance lower than the reflectance of the first plane surface, and the second plane surface being formed of a filter with a reflectance varied in a predetermined wavelength band;
the filter has a first reflectance for a first wavelength, a second reflectance for a second wavelength that is longer than the first wavelength, a third reflectance for a third wavelength that is longer than the second wavelength, and a fourth reflectance for a fourth wavelength that is longer than the third wavelength, in the predetermined wavelength range within a wavelength range used for optical communication;

the first reflectance is larger than the second reflectance, the third reflectance is smaller than the fourth reflectance, the rate of the absolute value of the difference between the first reflectance and the fourth reflectance relative to the first reflectance is larger than 0% and equal to or less than 5%, and the rate of the absolute value of the difference between the second reflectance and the third reflectance relative to the second reflectance is equal to or larger than 0% and equal to or less than 5%;
the value of the reflectance is monotonously decreased between the first and second wavelengths, and the value of the reflectance is monotonously increased between the third and fourth wavelengths; and
the first, second, and third variable dispersion compensating units are cascade-connected.

23. The variable dispersion compensator according to claim 22, wherein:
each of the first, second, and third variable dispersion compensating units has temperature control means that is independent from the other temperature control means; and
each of the temperature control means has a converting unit that sets the temperature of the corresponding optical resonator to a desired temperature based on a set amount of dispersion.

24. The variable dispersion compensator according to claim 22, wherein
the first optical resonator and the first mirror are disposed in parallel with each other.

25. The variable dispersion compensator according to claim 22, wherein
the third variable dispersion compensating unit has a third mirror disposed to be opposed to and with a predetermined angle of 0° or more relative to the third optical resonator, and reflects the light beam $n_3$ times ($n_3$ is a counting number).

26. The variable dispersion compensator according to claim 22, wherein
the filter is formed of a dielectric multi-layer film with a structure in which a first dielectric film and a second dielectric film are alternately laminated, the first dielectric film having a first refractive index and a predetermined thickness, and the second dielectric film having a second refractive index lower than the first refractive index and the predetermined thickness.

27. The variable dispersion compensator according to claim 26, wherein
the first dielectric is made of any one of $Ta_2O_5$, $TiO_2$, $Nb_2O_5$, $MgF_2$, MgO, $Al_2O_3$, $HfO_2$, and $ZrO_2$, and the second dielectric is made of $SiO_2$.

28. The variable dispersion compensator according to claim 22, wherein
the light beam enters an output side of each of the first, second, and third optical resonators.

29. The variable dispersion compensator according to claim 22, wherein
at least one of the optical resonators of the first, second, and third variable dispersion compensating units uses a multi-cavity etalon.

30. The variable dispersion compensator according to claim 22, wherein
at least one of the optical resonators of the first, second, and third variable dispersion compensating units uses a ring cavity.

31. The variable dispersion compensator according to claim 22, wherein
the angle formed between the second optical resonator and the second mirror is equal to or less than 1°.

32. The variable dispersion compensator according to claim 22, wherein
the first, second and third optical resonators each have temperature control means that is independent from the other temperature control means, and the temperature control range of each of the temperature control means is 5° or more.

33. The variable dispersion compensator according to claim 22, wherein
each of the optical resonators has a substrate made of a material whose thermal expansion coefficient is equal to or less than $1\times10^{-4}$ and equal to or more than $1\times10^{-6}$.

* * * * *

UNITED STATES PATENT AND TRADEMARK OFFICE
CERTIFICATE OF CORRECTION

| | |
|---|---|
| PATENT NO. | : 7,590,356 B2 |
| APPLICATION NO. | : 11/641743 |
| DATED | : September 15, 2009 |
| INVENTOR(S) | : Sugawara et al. |

It is certified that error appears in the above-identified patent and that said Letters Patent is hereby corrected as shown below:

On the title page, Item (73) please amend the spelling of the Assignee from --Hitachi Metals Ltd.-- to "Hitachi Metals, Ltd."

Signed and Sealed this

Nineteenth Day of October, 2010

David J. Kappos
*Director of the United States Patent and Trademark Office*